(12) United States Patent
Utsunomiya et al.

(10) Patent No.: US 11,919,319 B2
(45) Date of Patent: Mar. 5, 2024

(54) IMAGE PROCESSING DEVICE, RECORDING APPARATUS, IMAGE PROCESSING METHOD, AND NON-TRANSITORY COMPUTER-READABLE STORAGE MEDIUM STORING PROGRAM

(71) Applicant: Seiko Epson Corporation, Tokyo (JP)

(72) Inventors: Kohei Utsunomiya, Matsumoto (JP); Satoshi Yamazaki, Matsumoto (JP); Nobuaki Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 435 days.

(21) Appl. No.: 17/360,333

(22) Filed: Jun. 28, 2021

(65) Prior Publication Data

US 2021/0402794 A1 Dec. 30, 2021

(30) Foreign Application Priority Data

Jun. 30, 2020 (JP) ................................ 2020-113031

(51) Int. Cl.
*B41J 2/205* (2006.01)
*B41J 2/01* (2006.01)
*B41J 2/07* (2006.01)
*B41J 2/155* (2006.01)
*B41J 2/21* (2006.01)
*B41J 3/407* (2006.01)
*B41J 19/14* (2006.01)
*H04N 1/405* (2006.01)
*B41J 29/393* (2006.01)

(52) U.S. Cl.
CPC ............... *B41J 2/2054* (2013.01); *B41J 2/01* (2013.01); *B41J 2/07* (2013.01); *B41J 2/155* (2013.01); *B41J 2/2132* (2013.01); *B41J 3/4073* (2013.01); *B41J 19/145* (2013.01); *H04N 1/4051* (2013.01); *B41J 29/393* (2013.01)

(58) Field of Classification Search
CPC ..... B41J 2/2054; B41J 2/01; B41J 2/07; B41J 2/155; B41J 2/2132; B41J 3/4073; B41J 19/145; B41J 29/393; H04N 1/4051
See application file for complete search history.

(56) References Cited

U.S. PATENT DOCUMENTS

2007/0216954 A1* 9/2007 Kakutani ............. H04N 1/4051
358/1.9

FOREIGN PATENT DOCUMENTS

| EP | 0665682 A2 * | 8/1995 | ............... H04N 1/60 |
| JP | 2010-214962 | 9/2010 | |
| JP | 2010214962 A * | 9/2010 | ............... B41J 2/01 |

* cited by examiner

*Primary Examiner* — Yaovi M Ameh
(74) *Attorney, Agent, or Firm* — WORKMAN NYDEGGER

(57) ABSTRACT

Wherein, in the first dither mask, when the first space is cut by the first plane, a plurality of threshold values in the first plane has a blue noise characteristic in the spatial frequency domain, and when the first space is cut by a second plane extending in a direction different from that of the first plane, a plurality of threshold values in the second plane has a blue noise characteristic in the spatial frequency domain.

22 Claims, 20 Drawing Sheets

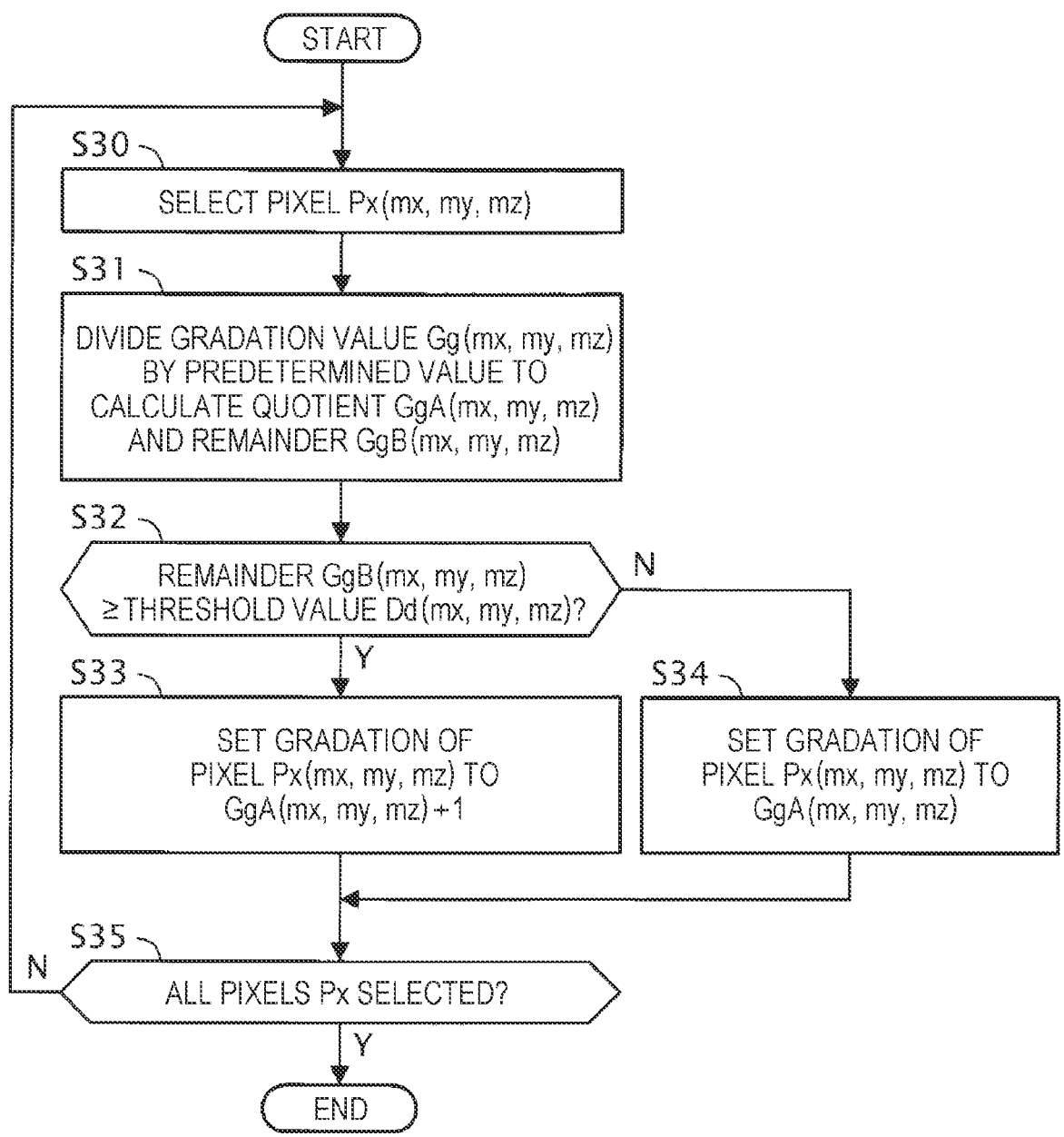

IMAGE PROCESSING DEVICE, RECORDING APPARATUS, IMAGE PROCESSING METHOD, AND NON-TRANSITORY COMPUTER-READABLE STORAGE MEDIUM STORING PROGRAM

The present application is based on, and claims priority from JP Application Serial Number 2020-113031, filed Jun. 30, 2020, the disclosure of which is hereby incorporated by reference herein in its entirety.

BACKGROUND

1. Technical Field

The present disclosure relates to an image processing device, a recording apparatus, an image processing method, and a non-transitory computer-readable storage medium storing a program.

2. Related Art

As described in JP-A-2010-214962, a technique for forming an image in a two-dimensional plane by performing a halftone process using a two-dimensional dither mask has been known in the related art.

However, in the related art technique, there is a problem that an image having a shape other than a two-dimensional plane can not be formed.

SUMMARY

According to an aspect of the present disclosure, an image processing device includes an acquisition unit acquiring, when representing an image in a three-dimensional first space, first image data indicating a gradation value of an image to be displayed by each of a plurality of pixels in the first space, and a generation unit generating first display data by quantizing a gradation value indicated by the first image data using a three-dimensional first dither mask having a plurality of threshold values corresponding to a plurality of pixels in the first space, wherein in the three-dimensional first dither mask, when the first space is cut by a first plane, a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by a second plane that is not parallel to the first plane, a plurality of threshold values in the second plane has a frequency characteristic in which an amount of high frequency components in a range of spatial frequencies higher than the predetermined frequency is larger than an amount of low frequency components in a range of spatial frequencies lower than the predetermined frequency in a spatial frequency domain.

According to another aspect of the present disclosure, in a recording apparatus that forms an image on a three-dimensional object, the recording apparatus includes a head unit ejecting a liquid and a controller controlling an ejection of a liquid from the head unit so that the image is formed on the object by a plurality of dots formed by the liquid ejected from the head unit, wherein the controller controls an ejection of a liquid from the head unit so that when the object has a first face, a distribution of a plurality of dots in the first face has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the object has a second face extending in a direction different from a direction of the first face, a distribution of a plurality of dots in the second face has a frequency characteristic in which an amount of high frequency components in a range of spatial frequencies higher than a predetermined frequency is larger than an amount of low frequency components in a range of spatial frequencies lower than the predetermined frequency in a spatial frequency domain.

According to an aspect of the present disclosure, an image processing method includes an acquisition step of acquiring, when representing an image in a three-dimensional first space, first image data indicating a gradation value of an image to be displayed by each of a plurality of pixels in the first space, and a generation step of generating first display data by quantizing a gradation value indicated by the first image data using a three-dimensional first dither mask having a plurality of threshold values corresponding to a plurality of pixels in the first space, wherein in the three-dimensional first dither mask, when the first space is cut by a first plane, a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by a second plane that is not parallel to the first plane, a plurality of threshold values in the second plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

According to an aspect of the present disclosure, in a non-transitory computer-readable storage medium storing a program, the program causes a computer to function as an acquisition unit acquiring, when representing an image in a three-dimensional first space, first image data indicating a gradation value of an image to be displayed by each of a plurality of pixels in the first space, and a generation unit generating first display data by quantizing a gradation value indicated by the first image data using a three-dimensional first dither mask having a plurality of threshold values corresponding to a plurality of pixels in the first space, wherein in the three-dimensional first dither mask, when the first space is cut by a first plane, a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by a second plane that is not parallel to the first plane, a plurality of threshold values in the second plane has a frequency characteristic in which an amount of high frequency components in a range of spatial frequencies higher than the predetermined frequency is larger than an amount of low frequency components in a range of spatial frequencies lower than the predetermined frequency in a spatial frequency domain.

BRIEF DESCRIPTION OF THE DRAWINGS

FIG. 30 is a flowchart showing an example of the quantization process according to Modification 7.

DESCRIPTION OF EXEMPLARY EMBODIMENTS

Hereinafter, embodiments for carrying out the present disclosure will be described with reference to the drawings. However, in each figure, the size and scale of each part are appropriately changed from the actual ones. In addition, since the embodiments described below are preferable specific examples of the present disclosure, there are various technically preferred limitations. However, the scope of the present disclosure is not limited to these embodiments unless otherwise specified in the following description.

A. Embodiment

A recording system Sys according to the present embodiment will be described. In the present embodiment, the recording system Sys is a system for forming an image G on a surface SF of an object Obj having a three-dimensional shape. The recording system Sys may be able to form the image G for the object Obj having a two-dimensional shape.

1. Overview of Recording System Sys

In the following, first, an outline example of the configuration of the recording system Sys according to the present embodiment will be described with reference to FIGS. 1 to 3.

Figure 1:
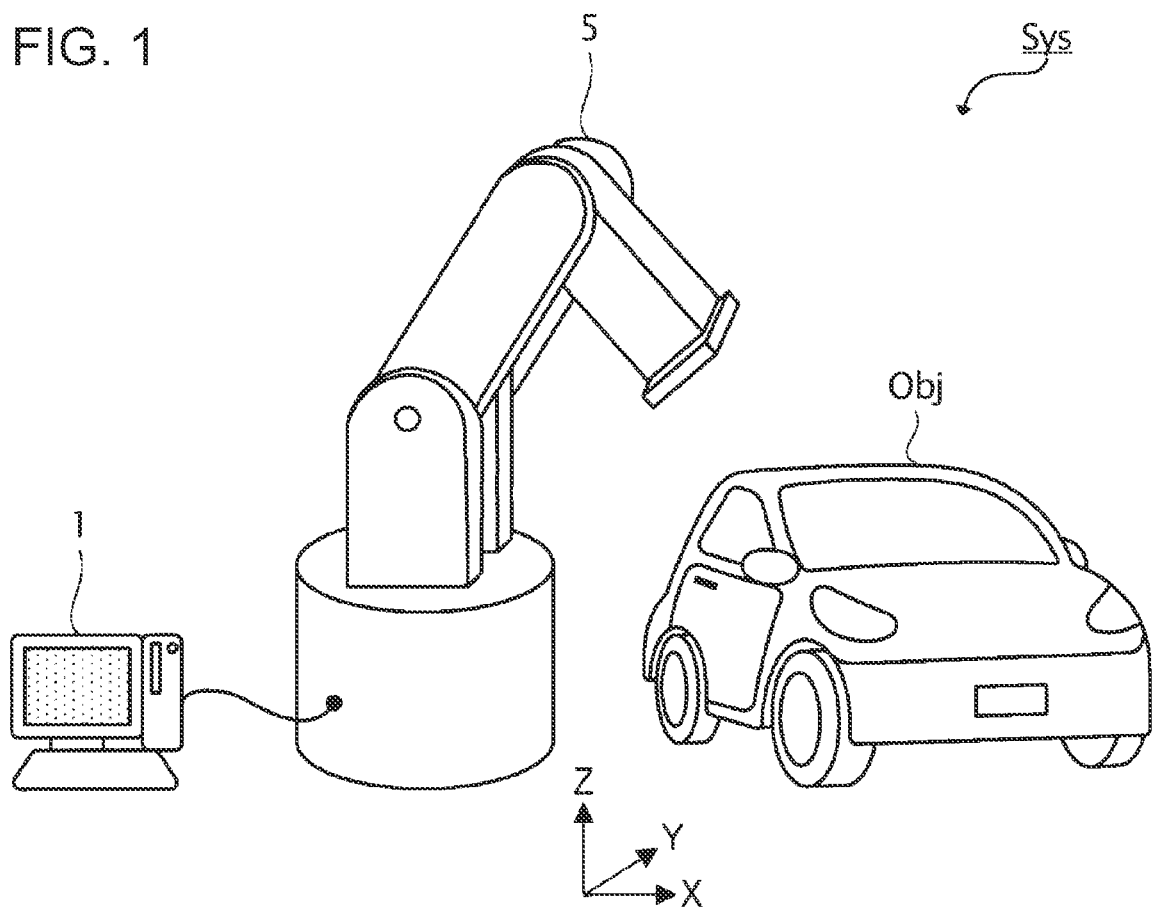
FIG. 1 is an explanatory diagram showing an example of a recording system according to an embodiment of the present disclosure.

FIG. 1 is an explanatory diagram showing an example of the recording system Sys.

As illustrated in FIG. 1, the recording system Sys includes a terminal device 1 and a recording apparatus 5. The terminal device 1 generates display data Img indicating the image G formed on the surface SF of the object Obj by the recording system Sys. The recording apparatus 5 forms the image G indicated by the display data Img on the surface SF of the object Obj based on the display data Img generated by the terminal device 1.

As illustrated in FIG. 1, the terminal device 1 sets a three-dimensional coordinate system having the X axis, the Y axis, and the Z axis in an image formation space SP which is a three-dimensional space in which an object Obj exists. In the following, one direction along the X axis is referred to as the +X direction, the direction opposite to the +X direction is referred to as the −X direction, one direction along the Y axis is referred to as the +Y direction, the direction opposite to the +Y direction is referred to as the −Y direction, one direction along the Z axis is referred to as the +Z direction, and the direction opposite to the +Z direction is referred to as the −Z direction. Further, in the following, the +X direction and the −X direction may be collectively referred to as the X axis direction, the +Y direction and the −Y direction may be collectively referred to as the Y axis direction, and the +Z direction and the −Z direction may be collectively referred to as the Z axis direction. In the present embodiment, it is assumed that the terminal device 1 sets the X axis, the Y axis, and the Z axis so as to be orthogonal to each other, but the present disclosure is not limited to such an aspect as long as the X axis, Y axis, and Z axis may be defined so as to intersect each other.

Figure 2:
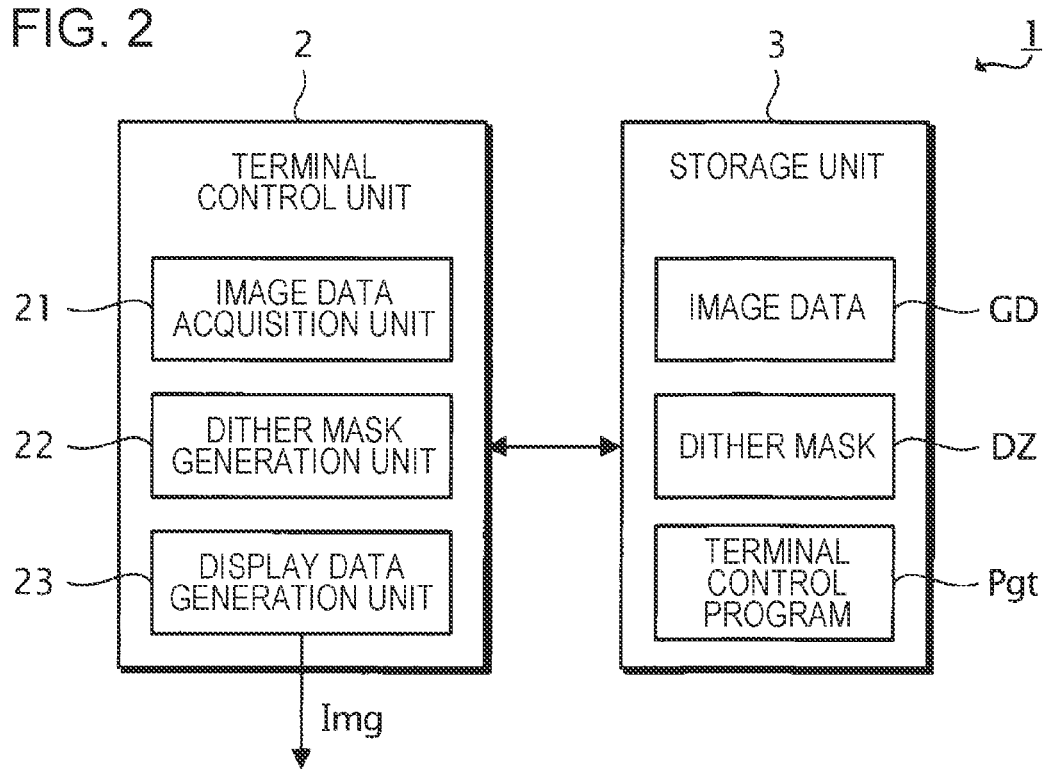
FIG. 2 is a functional block diagram showing an example of the configuration of the terminal device.

FIG. 2 is a functional block diagram showing an example of the configuration of the terminal device 1.

As illustrated in FIG. 2, the terminal device 1 includes a terminal control unit 2 and a storage unit 3.

The storage unit 3 stores image data GD, a dither mask DZ, and a control program Pgt of the terminal device 1. Of these, the image data GD indicates, for example, an image Gf that a user of the recording system Sys intends to form on the surface SF of the object Obj using the recording system Sys. Specifically, the image data GD indicates the gradation value of the image Gf corresponding to each of a plurality of pixels Px constituting the image formation space SP. Although the details will be described later, the recording system Sys may not be able to express the gradation value of the image Gf indicated by the image data GD. Therefore, the recording system Sys forms the image G in which the image Gf is expressed by a gradation value that can be expressed by the recording system Sys. Specifically, the recording system Sys performs the quantization process using the dither mask DZ stored in the storage unit 3 on the image data GD to generate the display data Img, and forms the image G indicated by the generated display data Img on the surface SF of the object Obj. In the present embodiment, as will be described later, the image data GD is 8-bit 256-value data, the display data Img is 1-bit binary data, and as a quantization process, the halftone process (binarization process) is performed in which the 256 values are low-gradation converted to binary.

As illustrated in FIG. 2, the terminal control unit 2 includes one or a plurality of CPUs and controls respective units of the terminal device 1. Here, the CPU is an abbreviation for a central processing unit. One or a plurality of CPUs provided in the terminal control unit 2 can execute the control program Pgt stored in the storage unit 3 and operate according to the control program Pgt to function as an image data acquisition unit 21 and a dither mask generation unit 22, and a display data generation unit 23.

The image data acquisition unit 21 acquires the image data GD stored in the storage unit 3. In the present embodiment, the case where the image data GD is stored in the storage unit 3 is assumed as an example, but the present disclosure is not limited to such an aspect. For example, the image data GD may be stored in an external device existing outside the terminal device 1. In this case, the image data acquisition unit 21 may acquire the image data GD from the external device. The dither mask generation unit 22 generates the dither mask DZ and stores the generated dither mask DZ in the storage unit 3. The display data generation unit 23 generates the display data Img by performing the quantization process on the image data GD using the dither mask DZ.

Figure 3:
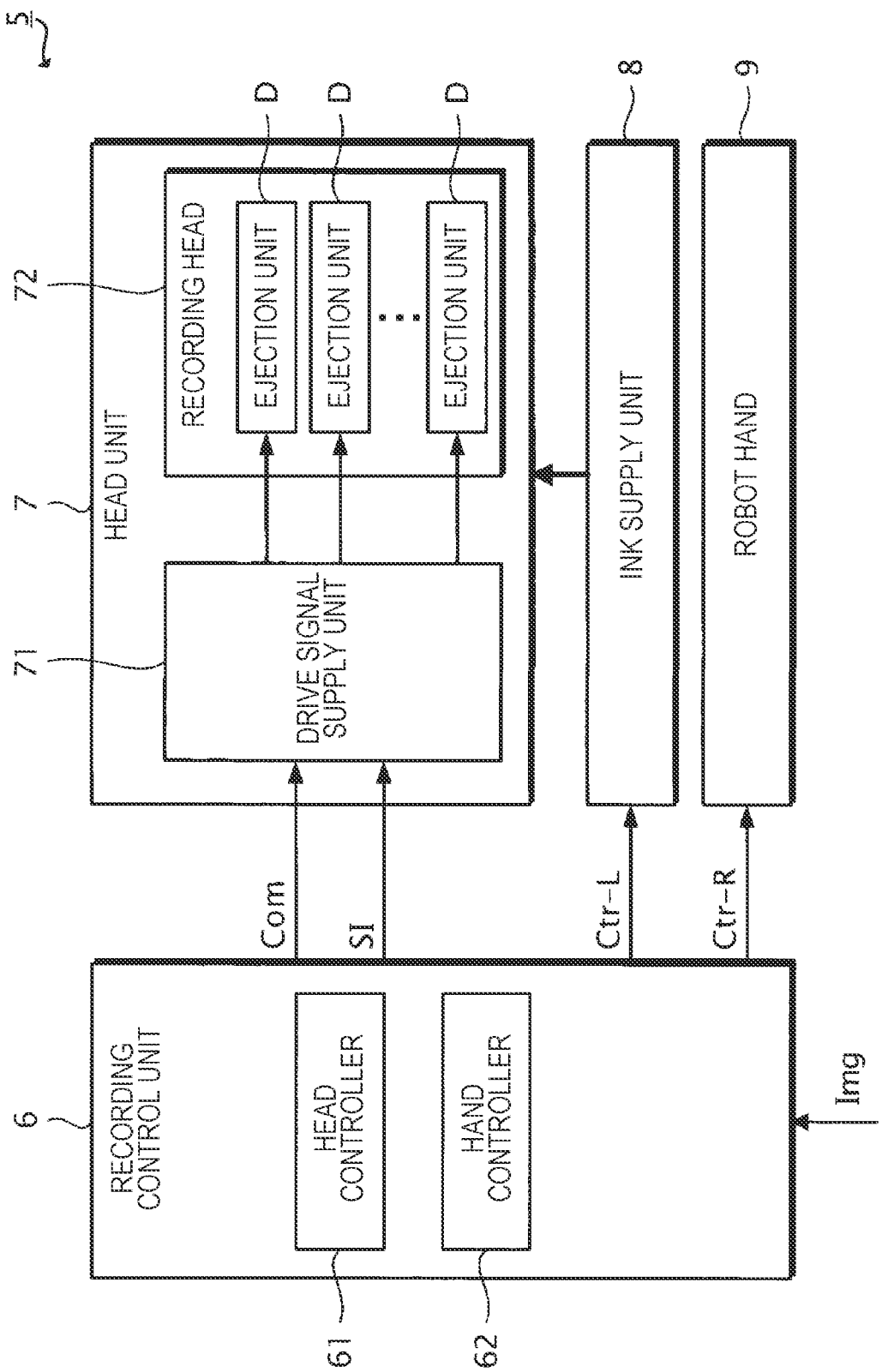
FIG. 3 is a functional block diagram showing an example of the configuration of a recording apparatus.

FIG. 3 is a functional block diagram showing an example of the configuration of the recording apparatus 5.

As illustrated in FIG. 3, the recording apparatus 5 includes a recording control unit 6, a head unit 7, an ink supply unit 8, and a robot hand 9.

The recording control unit 6 includes a processing circuit such as a CPU or an FPGA and a storage circuit such as a semiconductor memory, and controls respective elements of the recording apparatus 5. Here, the FPGA is an abbreviation for a field programmable gate array. The processing circuit provided in the recording control unit 6 can function as a head controller 61 and a hand controller 62. The head controller 61 generates a drive control signal SI for controlling the drive of the head unit 7 based on the display data Img. Further, the head controller 61 generates a drive signal Com for driving the head unit 7 and a control signal Ctr-L for controlling the ink supply unit 8. The hand controller 62 generates a control signal Ctr-R for controlling the position and the posture of the robot hand 9 in the image formation space SP based on the display data Img.

The head unit 7 includes a drive signal supply unit 71 and a recording head 72. The recording head 72 includes a plurality of ejection units D. The ejection unit D is driven by the drive signal Com to eject the ink with which the inside of the ejection unit D is filled. The drive signal supply unit 71 switches whether to supply the drive signal Com to each of the plurality of ejection units D based on the drive control signal SI. In the embodiment, it is assumed that the head unit 7 is attached to the tip of the robot hand 9 as an example.

The ink supply unit 8 supplies the ink stored in the ink supply unit 8 to the head unit 7 based on the control signal Ctr-L.

The robot hand 9 changes the position and the posture of the tip of the robot hand 9 in the image formation space SP based on the control signal Ctr-R. As a result, the robot hand 9 changes the position and the posture of the head unit 7 in the image formation space SP so that the head unit 7 attached to the tip of the robot hand 9 has the position and the posture suitable for forming the image G on the surface SF of the object Obj.

As described above, when the display data Img is supplied, the recording control unit 6 controls the ink ejection from the plurality of ejection units D provided in the head unit 7 by the drive control signal SI generated based on the display data Img. Further, the recording control unit 6 controls the position and the posture of the head unit 7 attached to the tip of the robot hand 9 in the image formation space SP by the control signal Ctr-R generated based on the display data Img. Therefore, the recording apparatus 5 can form the image G according to the display data Img on the surface SF of the object Obj disposed in the image formation space SP. In the following, a process in which the recording apparatus 5 forms the image G according to the display data Img on the surface SF of the object Obj may be referred to as a printing process.

2. Various Pieces of Data

Hereinafter, an example of various pieces of data stored in the recording system Sys according to the present embodiment will be described with reference to FIGS. 4 to 7.

First, in order to explain various pieces of data stored in the recording system Sys, a plurality of pixels Px disposed in the image formation space SP will be described.

Figure 4:
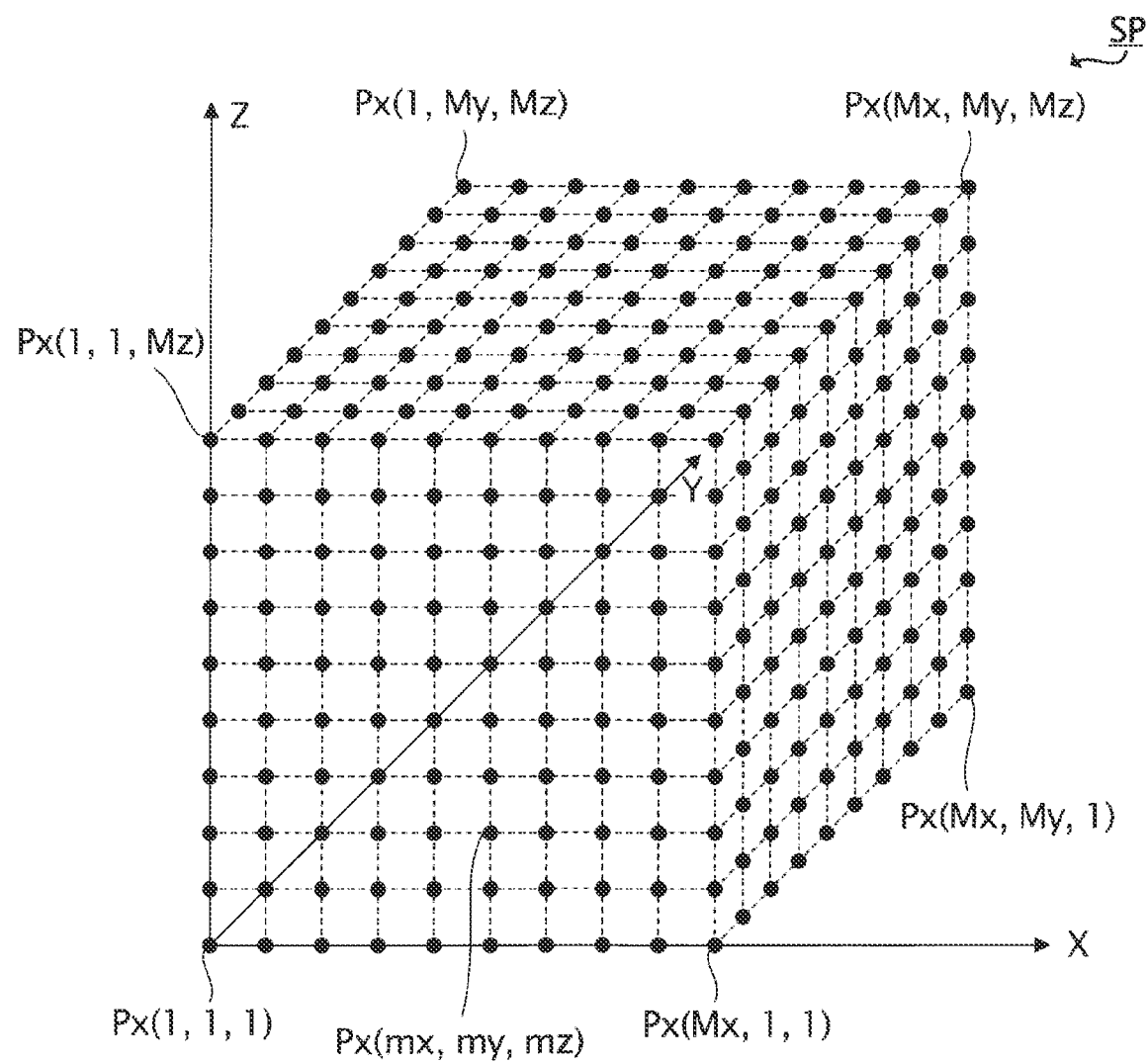
FIG. 4 is an explanatory diagram showing an example of an image formation space.

FIG. 4 is an explanatory diagram showing an example of a plurality of pixels Px disposed in the image formation space SP.

As illustrated in FIG. 4, in the image formation space SP according to the present embodiment, A total of Mx*My*Mz pixels Px are disposed so that Mx pixels Px extend in the X axis direction, My pixels Px extend in the Y axis direction, and Mz pixels Px extend in the Z axis direction. Here, the value Mx is a natural number of 2 or more, the value My is a natural number of 2 or more, and the value Mz is a natural number of 2 or more. The value Mx, the value My, and the value Mz are preferably natural numbers of 128 or more. In the present embodiment, as an example, it is assumed that the value Mx, the value My, and the value Mz are natural numbers of 256 or more. Further, in the following, a natural number M where M=Mx*My*Mz is defined. That is, in the present embodiment, M pixels Px are disposed in the image formation space SP.

Further, in the following, a natural number variable mx satisfying $1 \leq mx \leq Mx$ is introduced, a natural number variable my satisfying $1 \leq my \leq My$ is introduced, and a natural number variable mz satisfying $1 \leq mz \leq My$ is introduced. As illustrated in FIG. 4, of the M pixels Px existing in the image formation space SP, the pixel Px located at the mx-th position when counted from the −X side to the +X side in the X axis direction, located at the my-th position when counted from the −Y side to the +Y side in the Y axis direction, and located at the mz-th position when counted from the −Z side to the +Z side in the Z axis direction may be referred to as a pixel Px(mx, my, mz). Also, in the following, the position of the pixel Px(mx, my, mz) in the X axis direction in the image formation space SP is referred to as an X[mx], the position of the pixel Px(mx, my, mz) in the Y axis direction in the image formation space SP is referred to as a Y[my], and the position of the pixel Px(mx, my, mz) in the Z axis direction in the image formation space SP is referred to as a Z[mz]. That is, the position of the pixel Px(mx, my, mz) in the image formation space SP are expressed as (X, Y, Z)=(X[mx], Y[my], Z[mz]).

Figure 5:
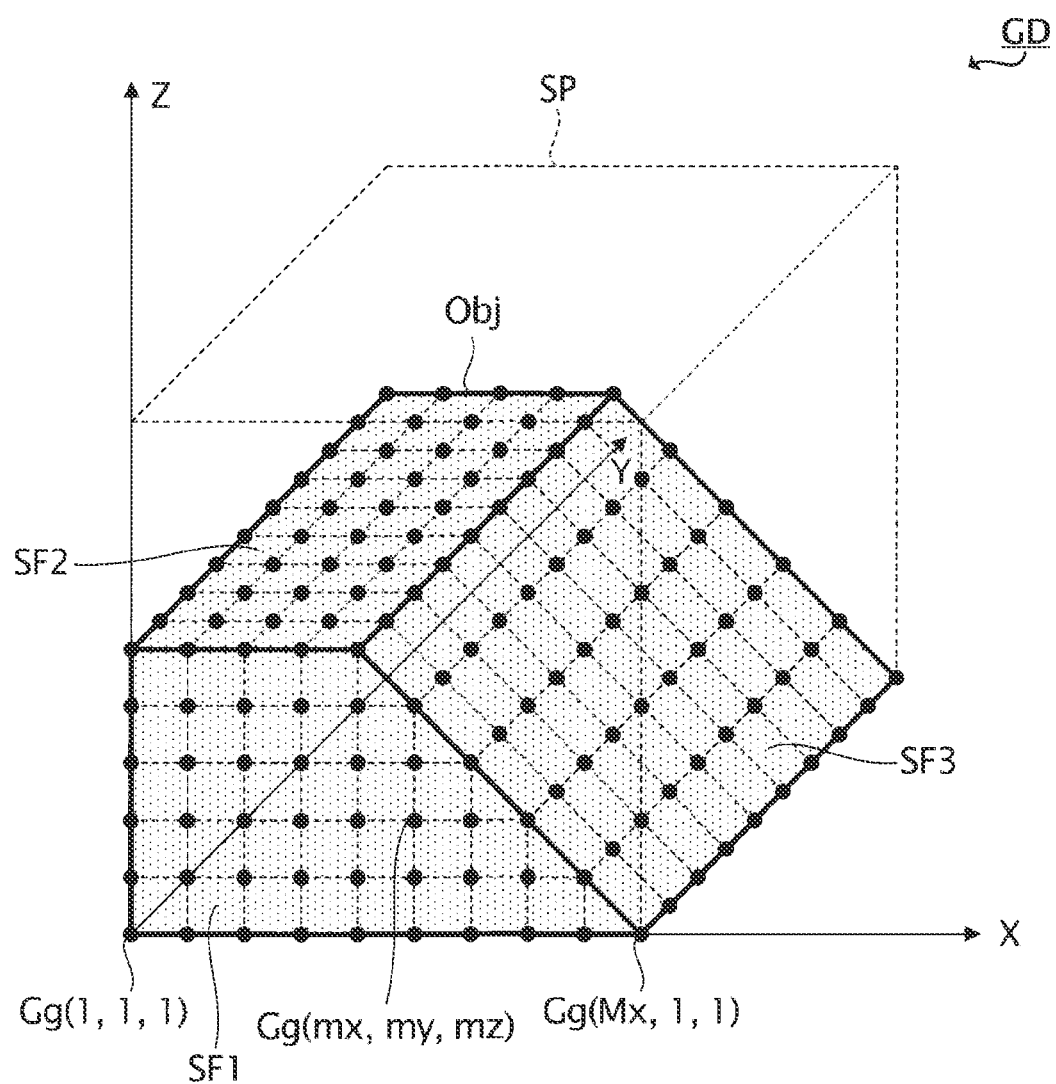
FIG. 5 is an explanatory diagram showing an example of image data.

FIG. 5 is an explanatory diagram for explaining an example of the image data GD. In FIG. 5, as an example, it is assumed that the surface SF of the object Obj includes a plane SF1, a plane SF2, and a plane SF3.

As described above, the image data GD is data indicating the image Gf. Specifically, the image data GD indicates a gradation value to be displayed by each of the M pixels Px existing in the image formation space SP in order to display the image Gf in the image formation space SP. In the following, as illustrated in FIG. 5, the gradation value of the image Gf at the pixel Px(mx, my, mz) indicated by the image data GD is referred to as a gradation value Gg(mx, my, mz).

In the embodiment, it is assumed that the gradation value Gg(mx, my, mz) is a natural number between the minimum gradation value Gg-min and the maximum gradation value Gg-max. Specifically, in the present embodiment, for example, it is assumed that the gradation value Gg-min is "0" and the gradation value Gg-max is "255". Then, in the present embodiment, it is assumed that the gradation value Gg(mx, my, mz) is any one of the 256 values from "0" to "255". Further, in the present embodiment, the gradation value Gg(mx, my, mz), in the image formation space SP, in which the surface SF of the object Obj does not exist has a pixel Px(mx, my, mz) which is set to the gradation value Gg-min. In the present embodiment, when the gradation value Gg(mx, my, mz) is the gradation value Gg-min, the pixel Px(mx, my, mz) is a pixel Px that displays nothing. That is, in the present embodiment, the image Gf does not exist in the pixel Px(mx, my, mz) whose gradation value Gg(mx, my, mz) is the gradation value Gg-min.

Figure 6:
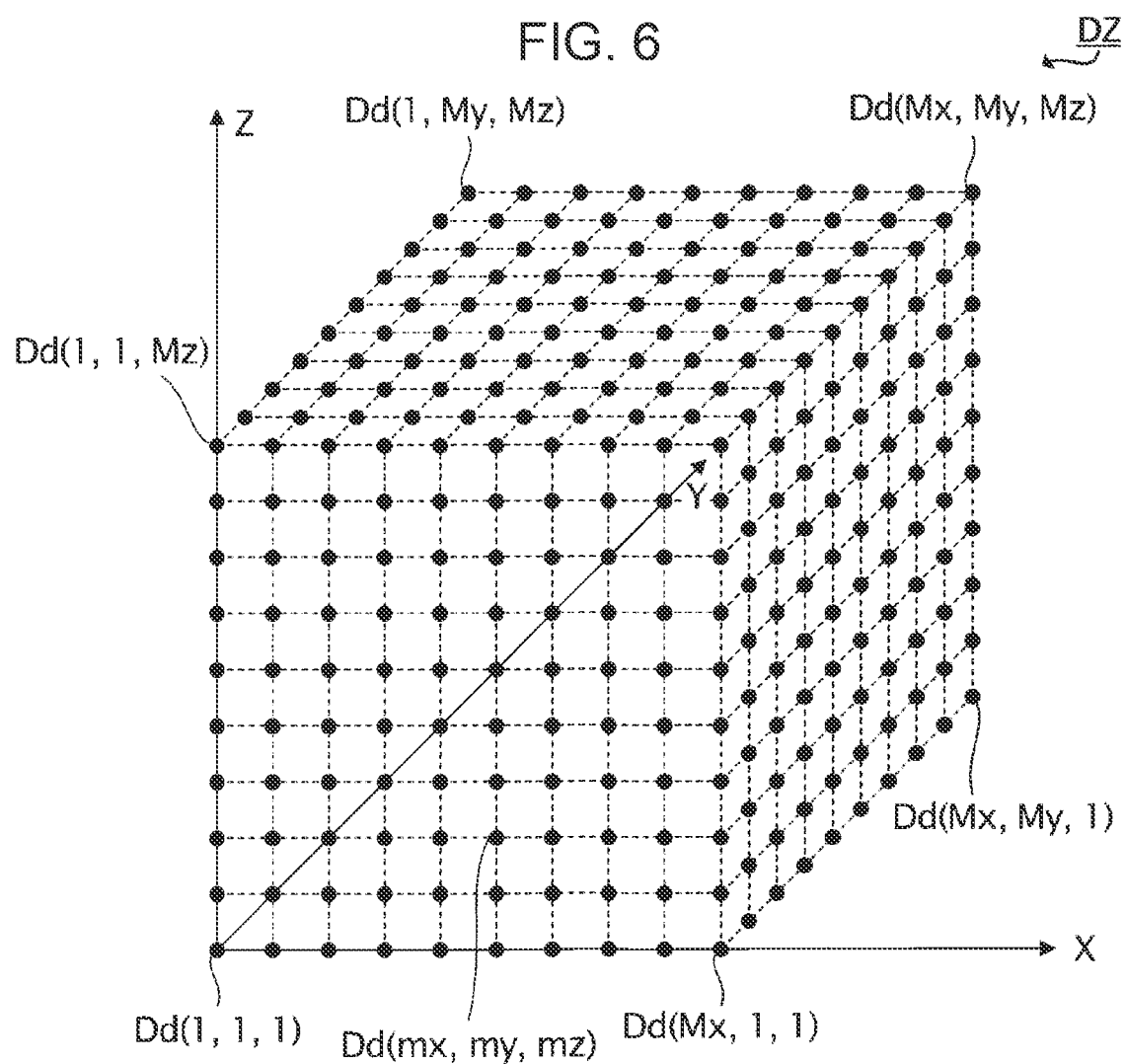
FIG. 6 is an explanatory diagram showing an example of a dither mask.

FIG. 6 is an explanatory diagram for explaining an example of the dither mask DZ.

As illustrated in FIG. 6, the dither mask DZ has M threshold values Dd corresponding one-to-one to M pixels Px in the image formation space SP. Hereinafter, the threshold value Dd corresponding to the pixel Px(mx, my, mz) is referred to as a threshold value Dd(mx, my, mz).

In the present embodiment, in consideration of the magnitude of the threshold value Dd, the M threshold values Dd corresponding to the M pixels Px may be expressed as the threshold values Dd[1] to Dd[M]. In the present embodiment, when the value m is a natural number satisfying 1≤m≤M, it is assumed that the threshold value Dd[m] satisfies the following Equations (1) to (3).

$$Dd[1]=1+Gg\text{-min} \quad (1)$$

$$Dd[M]=Gg\text{-max} \quad (2)$$

$$Dd[m]\leq Dd[m+1] \quad (3)$$

The threshold value Dd[1] may satisfy Dd[1]≥1+Gg-min instead of the above-mentioned Equation (1). Further, the threshold value Dd[M] may satisfy Dd[M] Gg-max instead of the above-mentioned Equation (2). In the present embodiment, for convenience of explanation, the M threshold values Dd[1] to Dd[M] that the dither mask DZ has are grouped into one or a plurality of threshold values Dd[m] having an equal value with each other. That is, in the present embodiment, the M threshold values Dd[1] to Dd[M] that the dither mask DZ has are divided into a plurality of groups so that one or a plurality of threshold values Dd[m] belonging to each group has an equal value to each other. Then, in the present embodiment, the threshold values Dd[1] to Dd[M] are defined so that the number of threshold values Dd[m] belonging to each group is substantially equal to each other. In other words, in the present embodiment, the threshold values Dd[1] to Dd[M] are defined such that the number of threshold values Dd[m] belonging to one group is substantially equal to the number of threshold values Dd[m] belonging to another group. The determination is made in order to appropriately reproduce each gradation value by the display data Img described later regardless of the gradation value Gg indicated by the image data GD having any value from the gradation value Gg-min to the gradation value Gg-max. Further, in the following, the pixel Px corresponding to the threshold value Dd[m] may be expressed as a pixel Px[m].

For the dither mask DZ used in the present embodiment, the threshold values Dd[1] to Dd[M] are disposed so as to have a high dispersibility of a plurality of threshold values Dd[m] equal to or less than the near midpoint threshold value Dd[mh] larger than the threshold value Dd[1] and smaller than the threshold value Dd[M]. When quantitatively evaluating the dispersibility of a plurality of threshold values Dd[m] in the dither mask DZ, a conversion from the spatial domain to the spatial frequency domain is made on the plurality of threshold values Dd[m] that the dither mask DZ has, and the spatial frequency characteristic, which is a characteristic of a plurality of threshold values Dd[m] in the spatial frequency domain, can be used. An example of the arrangement of the threshold values Dd[1] to Dd[M] of the actual dither mask DZ in the spatial region will be described later with reference to FIGS. 10 to 12, and is omitted here.

Figure 7:
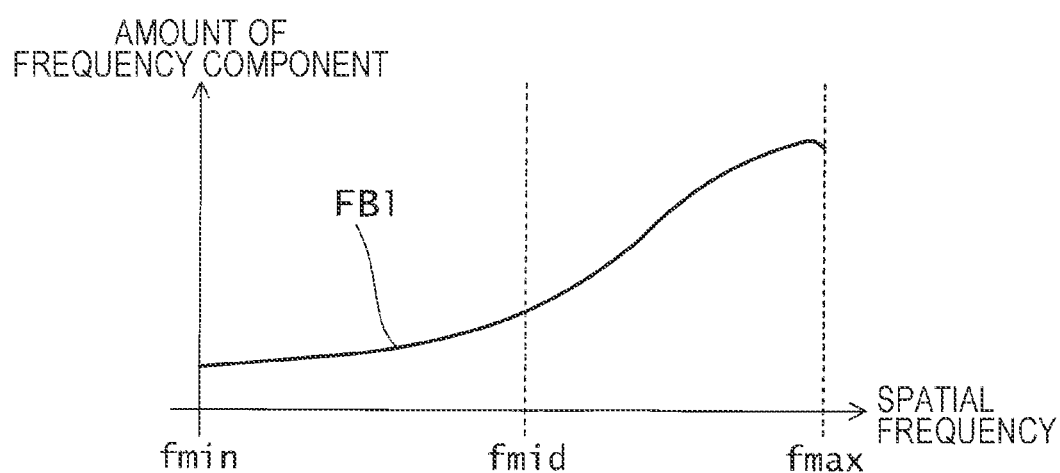
FIG. 7 is an explanatory diagram showing an example of a curve.

FIG. 7 is an explanatory diagram for explaining the spatial frequency characteristic of the threshold values Dd[1] to Dd[M] when the dither mask DZ is cut by a plane PL1. Specifically, FIG. 7 shows a curve FB1 showing the relationship between the spatial frequencies of the threshold values Dd[1] to Dd[M] and the power spectrum at each spatial frequency, that is, the amount of frequency components at each spatial frequency.

An example of the method of generating the curve FB1 will be described below. Firstly, the image formation space SP is cut by the plane PL1. Secondly, a pixel Px corresponding to the threshold value Dd[m], of the plurality of threshold values Dd[m] corresponding to the plurality of pixels Px located at the plane PL1, in which a value equal to or less than the near midpoint threshold value Dd[mh] is defined is defined as an ON pixel, and a pixel Px corresponding to the threshold value Dd[m] in which a value larger than the near midpoint threshold value Dd[mh] is defined is defined as an OFF pixel. Thirdly, a two-dimensional Fourier transform is performed on the plurality of ON pixels in the plane PL1 to acquire the spatial frequency and the amount of frequency components of the arrangement of the plurality of ON pixels in the plane PL1. FIG. 7 shows the curve FB1 in which the horizontal axis represents the spatial frequency acquired in this manner and vertical axis represents the amount of each frequency component. For the method in which the conversion from the spatial domain to the spatial frequency domain is made on a plurality of threshold values Dd[m] located at a specific plane of the plurality of threshold values Dd[m] that the three-dimensional dither mask DZ has, see T. Mitsa and K. J. Parker, "Digital Halftoning using a Blue Noise Mask", Proc. SPIE 1452, pp. 47-56 (1991).

As illustrated in FIG. 7, the curve FB1 according to the present embodiment has the characteristic in which the amount of the frequency components between the lowest frequency fmin, which is the lowest frequency, and the intermediate frequency fmid of the spatial frequencies of the arrangement of the plurality of ON pixels located at the plane PL1 is less than the frequency component between the highest frequency fmax, which is the highest frequency, and the intermediate frequency fmid of the spatial frequencies of the arrangement of the plurality of ON pixels located at the plane PL1. In other words, in FIG. 7, for the curve FB1, the integrated value in the range where the spatial frequency is from the lowest frequency fmin to the intermediate frequency fmid is smaller than the integrated value in the range where the spatial frequency is from the intermediate frequency fmid to the highest frequency fmax. Here, the intermediate frequency fmid is an intermediate frequency between the intermediate frequency fmid and the maximum frequency fmax. More specifically, the intermediate frequency fmid may be, for example, a frequency represented by fmid={fmin+fmax}÷2.

In the following, in the spatial frequency domain, the characteristic in which the amount of the frequency components between the minimum frequency fmin and the intermediate frequency fmid is less than the amount of the frequency components between the intermediate frequency fmid and the maximum frequency fmax is described as a "predetermined spatial frequency characteristic".

Also, in the following, the fact that the curve showing the relationship between the spatial frequency of one plane and the amount of each frequency component of the one plane in the spatial frequency domain acquired when a plurality of threshold values Dd, of the plurality of threshold values Dd that the dither mask DZ has, corresponding to a plurality of pixels Px located at the one plane by which the image formation space SP is cut is divided into the ON pixel and the OFF pixel in the same manner as described above to perform a two-dimensional Fourier transform on the plurality of ON pixels in the one plane has a predetermined spatial frequency characteristic is described as "the dither mask DZ has a predetermined spatial frequency characteristic in one plane". That is, the dither mask DZ used in the present embodiment has a predetermined spatial frequency characteristic in the plane PL1.

In the embodiment, the plane PL1 may be a plane parallel to the X axis direction. In other words, the plane PL1 may be a plane having a normal vector extending in a direction orthogonal to the X axis direction. Specifically, the plane PL1 may be a plane perpendicular to the YZ plane. Further, the plane PL1 may be a plane parallel to the Y axis direction. In other words, the plane PL1 may be a plane having a normal vector extending in a direction orthogonal to the Y axis direction. Specifically, the plane PL1 may be a plane parallel to the XY plane. As an example of the plane PL1, the plane Z=Z[1].

The near midpoint threshold value Dd[mh] preferably satisfies the following Equation (4).

$$(1-\gamma 1)*Dd[1]+\gamma 1*Dd[M] \leq Dd[mh] \leq (1-\gamma 2)*Dd[1]+\gamma 2*Dd[M] \quad (4)$$

where the value γ1 is, for example, a real number satisfying 0.2≤γ1≤0.5, and the value γ2 is, for example, a real number satisfying 0.5≤γ1≤0.8. In the embodiment, it is assumed that the value γ1 is "0.2" and the value γ2 is "0.8". As an example, when the threshold value Dd[1] is "1" and the threshold value Dd[M] is "255", the value γ1 is "0.2" and the value γ2 is "0.8", the near midpoint threshold value Dd[mh] is in the range of 51 Dd[mh] 204. For example, the near midpoint threshold value Dd[mh] is "64". This value is a threshold value Dd[m] located at the about ¼-th position starting from the threshold value Dd[1] when a plurality of threshold values Dd is disposed in order from the threshold value Dd[1], that is, "1" to the threshold value Dd[M], that is, "255".

As illustrated in FIG. 7, the curve FB1 according to the present embodiment has a peak at the maximum frequency fmax rather than the intermediate frequency fmid. For this reason, in the embodiment, the fact that the curve showing the relationship between the spatial frequency of one plane and the amount of each frequency component of the one plane in the spatial frequency domain acquired when a plurality of threshold values Dd, of the plurality of threshold values Dd that the dither mask DZ has, corresponding to a plurality of pixels Px located at the one plane by which the image formation space SP is cut is divided into the ON pixel and the OFF pixel in the same manner as described above to perform a two-dimensional Fourier transform on the plurality of ON pixels in the one plane has a peak at the highest frequency fmax rather than the intermediate frequency fmid may be referred to as a "predetermined spatial frequency characteristic".

More specifically, in the present embodiment, the predetermined spatial frequency characteristic is a blue noise characteristic. However, in the present embodiment, the predetermined spatial frequency characteristic is not limited to the blue noise characteristic. In the present embodiment, the predetermined spatial frequency characteristic may be a frequency characteristic in which the amount of the frequency components at the lowest frequency fmin is less than that at the intermediate frequency fmid in the spatial frequency domain, as compared with the white noise characteristic. That is, the predetermined spatial frequency characteristic may be closer to the blue noise characteristic rather than to the white noise characteristic. In other words, the predetermined spatial frequency characteristic may not be closer to the red noise characteristic than to the white noise characteristic. For example, in the present embodiment, the predetermined spatial frequency characteristic may be the purple noise characteristic.

For example, the following method of generating the curve FB1 can be also used. That is, firstly, the image formation space SP is cut by the plane PL1. Secondly, a curved surface PC1 is generated such that a plurality of threshold values Dd corresponding to a plurality of pixels Px located at the plane PL1 is represented as heights from the bottom face when the plane PL1 is the bottom face. Thirdly, a two-dimensional Fourier analysis is performed on the curved surface PC1 to obtain the amount of each frequency component of the curved surface PC1 in the spatial frequency domain. As a result, the curve FB1 showing the relationship between the spatial frequency of the curved surface PC1 and the amount of each frequency component of the curved surface PC1 in the spatial frequency domain can be generated.

Further, the dither mask DZ according to the present embodiment has a predetermined spatial frequency characteristic even in a plane PL2 different from the plane PL1.

Here, the plane PL2 is a plane extending in a direction different from that of the plane PL1. In other words, the plane PL2 is a plane having a normal vector extending in a direction different from that of the normal vector of the plane PL1. For example, the plane PL2 may be a plane orthogonal to the plane PL1. In other words, the plane PL2 may be a plane having a normal vector extending in a direction orthogonal to the normal vector of the plane PL1. Further, in the present embodiment, the plane PL2 may be a plane parallel to the Y axis direction. In other words, the plane PL2 may be a plane having a normal vector extending in a direction orthogonal to the Y axis direction. Specifically, the plane PL2 may be a plane perpendicular to the XZ plane. Further, the plane PL2 may be a plane parallel to the Z axis direction. In other words, the plane PL2 may be a plane having a normal vector extending in a direction orthogonal to the Z axis direction. Specifically, the plane PL2 may be a plane parallel to the YZ plane. As an example of the plane PL2, the plane X=X[1].

Further, the dither mask DZ according to the present embodiment may have a predetermined spatial frequency characteristic in a plane PL3 different from the plane PL1 and the plane PL2. Here, the plane PL3 is a plane parallel to the plane PL1. In other words, the plane PL3 is a plane having a normal vector extending in a direction same as the normal vector of the plane PL1. Further, in the present embodiment, the plane PL3 may be a plane parallel to the X axis direction. In other words, the plane PL3 may be a plane having a normal vector extending in a direction orthogonal to the X axis direction. Specifically, the plane PL3 may be a plane perpendicular to the YZ plane. Further, the plane PL3 may be a plane parallel to the Y axis direction. In other words, the plane PL3 may be a plane having a normal vector extending in a direction orthogonal to the Y axis direction. Specifically, the plane PL3 may be a plane parallel to the XY plane. As an example of the plane PL3, the plane Z=Z[2].

Further, the dither mask DZ according to the present embodiment may have a predetermined spatial frequency characteristic in a plane PL4 different from the planes PL1 to PL3. Here, the plane PL4 is a plane parallel to the plane PL2. In other words, the plane PL4 is a plane having a normal vector extending in a direction same as the normal vector of the plane PL2. Further, in the present embodiment, the plane PL4 may be a plane parallel to the Y axis direction. In other words, the plane PL4 may be a plane having a normal vector extending in a direction orthogonal to the Y axis direction. Specifically, the plane PL4 may be a plane perpendicular to the XZ plane. Further, the plane PL4 may be a plane parallel to the Z axis direction. In other words, the plane PL4 may be a plane having a normal vector extending in a direction orthogonal to the Z axis direction. Specifically, the plane PL4 may be a plane parallel to the YZ plane. As an example of the plane PL4, the plane X=X[2].

Further, the dither mask DZ according to the present embodiment may have a predetermined spatial frequency characteristic in a plane PL5 different from the planes PL1 to PL4. Here, the plane PL5 is a plane extending in a direction different from that of the plane PL1 and the plane PL2. In other words, the plane PL5 is a plane having a normal vector extending in a direction different from that of the normal vector of the plane PL1 and extending in a direction different from that of the normal vector of the plane PL2. For example, the plane PL5 may be a plane orthogonal to the plane PL1 and the plane PL2. In other words, the plane PL5 is a plane having a normal vector extending in a direction orthogonal to the normal vector of the plane PL1 and extending in a direction orthogonal to the normal vector of the plane PL2. Further, in the present embodiment, the plane PL5 may be a plane parallel to the Z axis direction. In other words, the plane PL5 may be a plane having a normal vector extending in a direction orthogonal to the Z axis direction. Specifically, the plane PL5 may be a plane perpendicular to the XY plane. Further, the plane PL5 may be a plane parallel to the X axis direction. In other words, the plane PL5 may be a plane having a normal vector extending in a direction orthogonal to the X axis direction. Specifically, the plane PL5 may be a plane parallel to the XZ plane. As an example of the plane PL5, the plane Y=Y[1].

Further, the dither mask DZ according to the present embodiment may have a predetermined spatial frequency characteristic in a plane PL6 different from the planes PL1 to PL5. Here, the plane PL6 is a plane parallel to the plane PL5. In other words, the plane PL6 is a plane having a normal vector extending in a direction same as the normal vector of the plane PL5. Further, in the present embodiment, the plane PL6 may be a plane parallel to the Z axis direction. In other words, the plane PL6 may be a plane having a normal vector extending in a direction orthogonal to the Z axis direction. Specifically, the plane PL6 may be a plane perpendicular to the XY plane. Further, the plane PL6 may be a plane parallel to the X axis direction. In other words, the plane PL6 may be a plane having a normal vector extending in a direction orthogonal to the X axis direction. Specifically, the plane PL6 may be a plane parallel to the XZ plane. As an example of the plane PL6, the plane Y=Y[2].

Further, the dither mask DZ according to the present embodiment may have a predetermined spatial frequency characteristic in any plane parallel to the plane PL1 of the planes by which the image formation space SP is cut. Further, the dither mask DZ according to the present embodiment may have a predetermined spatial frequency characteristic in any plane parallel to the plane PL2 of the planes by which the image formation space SP is cut. Further, the dither mask DZ according to the present embodiment may have a predetermined spatial frequency characteristic in any plane parallel to the plane PL5 of the planes by which the image formation space SP is cut.

In addition, "one plane and another plane extend in different directions" means that when, for example, the normal vector of one plane is expressed as a vector V1=(v1x, v1y, v1z), and the normal vector of another plane is expressed as a vector V2=(v2x, v2y, v2z) having the same length as that of the vector V1, at least one of |v1x|≠|v2x|, |v1y|≠|v2y|, and |v1z|≠|v2z| is satisfied.

3. Recording System Operation

Hereinafter, an example of the operation of the recording system Sys according to the present embodiment will be described with reference to FIGS. 8 and 9.

Figure 8:
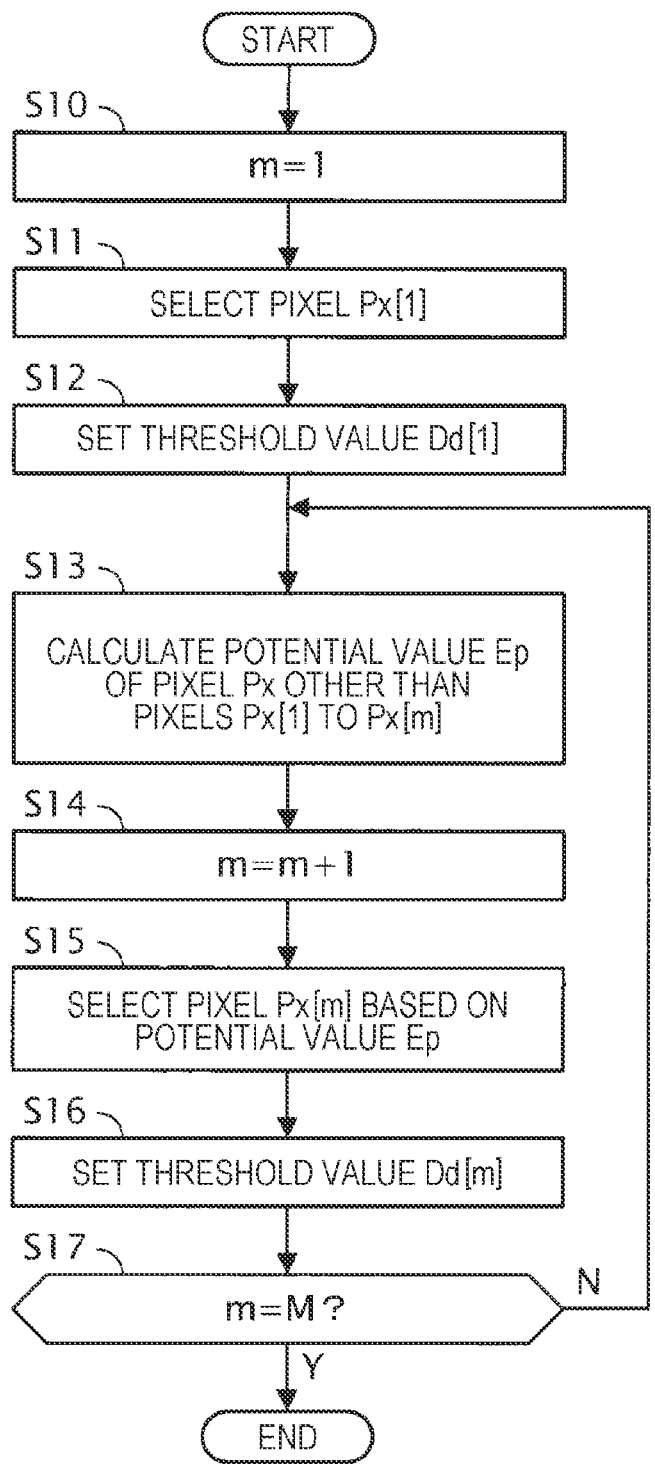
FIG. 8 is a flowchart showing an example of a dither mask generation process.

FIG. 8 is a flowchart showing an example of the operation of the recording system Sys when the recording system Sys executes the dither mask generation process. Here, the dither mask generation process is a process of generating the dither mask DZ.

As illustrated in FIG. 8, the dither mask generation unit 22 sets the variable m to "1" when the dither mask generation process is started (S10). Next, the dither mask generation unit 22 selects the pixel Px[1] corresponding to the threshold value Dd[1] from the M pixels Px in the image formation space SP (S11). Specifically, the dither mask generation unit 22 may randomly select, for example, the pixel Px[1] from the M pixels Px in step S11. Further, in step S11, the dither mask generation unit 22 may select, for example, a predetermined pixel Px predetermined from the M pixels Px as the pixel Px[1]. Next, the dither mask generation unit 22 sets the threshold value Dd(mx, my, mz) corresponding to the pixel Px(mx, my, mz) selected as the pixel Px[1] to the threshold value Dd[1] (S12). Specifically, in step S12, the dither mask generation unit 22 sets the threshold value Dd(mx, my, mz) corresponding to the pixel Px(mx, my, mz) selected as the pixel Px[1] to 1+Gg-min More specifically, since the gradation value Gg-min is "0" in the present embodiment, the dither mask generation unit 22 sets the threshold value Dd(mx, my, mz) corresponding to the pixel Px(mx, my, mz) selected as the pixel Px[1] to "1" in step S12.

Next, the dither mask generation unit 22 calculates a potential value Ep for each of the pixels Px other than the pixels Px[1] to Px[m] (S13). In the following, a pixel whose threshold value Dd[m] is not defined is referred to as a remaining pixel PxZ. For example, in step S13, the remaining pixels PxZ are pixels Px other than pixels Px[1] to Px[m]. Here, the potential value Ep is a value represented by the following Equation (5) using the individual potential value Ek[m].

$$Ep=Ek[1]+Ek[2]+ \ldots +Ek[m] \quad (5)$$

When m=1, the potential value Ep is represented by the following Equation (6) instead of Equation (5), and when m=2, the potential value Ep is represented by the following Equation (7) instead of Equation (5).

$$Ep=Ek[1] \quad (6)$$

$$Ep=Ek[1]+Ek[2] \quad (7)$$

where the individual potential value Ek[m] is a value represented by the following Equation (8).

$$Ek[m]=Cs[m] \div (R[m])^\beta \quad (8)$$

where the distance R[m] is a value indicating the distance between the pixel Px[m] and the remaining pixel PxZ. The value $\beta$ is a real number of "1" or more, and is preferably "2". The coefficient Cs[m] is a positive real number. The coefficient Cs[m] may be, for example, a predetermined constant or a value determined based on the threshold value Dd[m].

Next, the dither mask generation unit 22 adds "1" to the variable m (S14). In the present embodiment, as described above, the threshold value Dd[m+1] is the same value as the threshold value Dd[m] or a value larger than the threshold value Dd[m] by "1". As described above, the threshold values Dd[1] to Dd[M] are divided into a plurality of groups for each threshold value Dd having the same value. In the present embodiment, as an example, it is assumed that the threshold values Dd[1] to Dd[M] are divided into the Gg-max−Gg-min+1 groups. Further, in the present embodiment, as an example, it is assumed that a predetermined number Q of threshold values Dd belongs to each group. Here, the predetermined number Q is a value determined based on the value, Gg-max−Gg-min+1 and the value M. For example, the predetermined number Q may be, for example, a value obtained by dividing the value M by the value, Gg-max−Gg-min+1 and rounding it off. For example, when M is "8*8*8=512", the gradation value Gg-min is "0", and the gradation value Gg-max is "255", the predetermined number Q is 512÷256=2. Then, in this case, when the variable w satisfying 1≤w≤255 is introduced, the threshold value Dd[2*w−1] and the threshold value Dd[2*w] belong to the group in which the gradation value Gg corresponds to w. Then, the dither mask generation unit 22 selects the pixel Px[m] from one or a plurality of remaining pixels PxZ in the image formation space SP based on the potential value Ep determined corresponding to each remaining pixel PxZ (S15). Specifically, in step S15, the dither mask generation unit 22 selects the remaining pixel PxZ having the smallest potential value Ep from one or a plurality of remaining pixels PxZ as the pixel Px[m]. Next, the dither mask generation unit 22 sets the threshold value Dd(mx, my, mz) corresponding to the pixel Px(mx, my, mz) selected as the pixel Px[m] in step S15 to the threshold value Dd[m] (S16).

After that, the dither mask generation unit 22 determines whether the variable m is M (S17). Then, when the result of the determination is negative, the dither mask generation unit 22 advances the process to step S13. On the other hand, the dither mask generation unit 22 ends the dither mask generation process when the result of the determination is affirmative.

Figure 9:
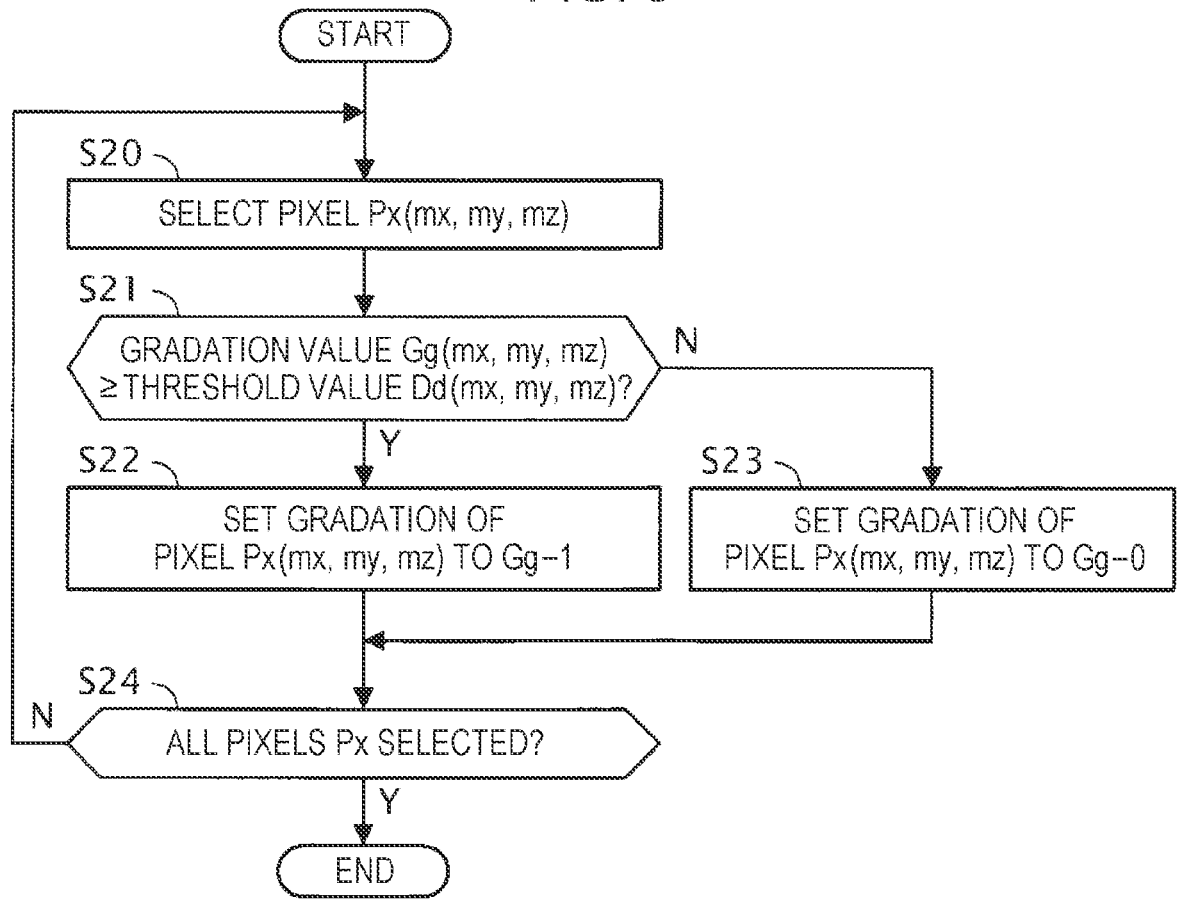
FIG. 9 is a flowchart showing an example of a quantization process.

FIG. 9 is a flowchart showing an example of the operation of the recording system Sys when the recording system Sys executes the quantization process. As described above, the quantization process is a process of generating the display data Img based on the image data GD.

As illustrated in FIG. 9, when the quantization process is started, the display data generation unit 23 selects the pixel Px(mx, my, mz) from the M pixels Px in the image formation space SP (S20). Next, the display data generation unit 23 determines whether the gradation value Gg(mx, my, mz), of the plurality of gradation values Gg indicated by the image data GD, corresponding to the pixel Px(mx, my, mz) selected in step S20 is equal to or higher than the threshold value Dd(mx, my, mz), of the plurality of threshold values Dd indicated by the dither mask DZ, corresponding to the pixel Px(mx, my, mz) selected in step S20 (S21).

In the present embodiment, the display data Img indicates the gradation of the image G which is displayed by each of the M pixels Px existing in the image formation space SP in order to form the image G on the surface SF of the object Obj existing in the image formation space SP to be performed is shown. Specifically, in the present embodiment, the display data Img indicates whether the image G displayed by each pixel Px existing in the image formation space SP has the highest gradation value Gg-1 or the lowest gradation value Gg-0. For example, in the present embodiment, the highest gradation value Gg-1 is "1" and the lowest gradation value Gg-0 is "0". That is, the display data Img is data indicating the gradation of the image G displayed by each of the M pixels Px by binary values of "1" and "0". The pixel Px that displays the image G that has the highest gradation value Gg-1, that is, whose gradation value is "1" is the pixel Px in which a dot is formed by the ink ejected from the recording apparatus 5. Further, the pixel Px that displays the image G that has the lowest gradation value Gg-0, that is, whose gradation value is "0" is the pixel Px in which no dot are formed. Hereinafter, the image G of the highest gradation value Gg-1, that is, the image G in which the gradation value is "1" is displayed, and the pixel Px where a dot is formed is referred to as a dot formation pixel Px-1. Further, the image G of the lowest gradation value Gg-0, that is, the image G in which the gradation value is "0" is displayed, and the pixel Px where no dots are formed is referred to as a dot formation pixel Px-0.

As illustrated in FIG. 9, when the determination result in step S21 is affirmative, the display data generation unit 23 sets the gradation of the image G displayed by the pixel Px(mx, my, mz) in the display data Img to the highest gradation value Gg-1, that is, "1" (S22). On the other hand, when the result of the determination in step S21 is negative, the display data generation unit 23 sets the gradation of the image G displayed by the pixel Px(mx, my, mz) in the display data Img to the lowest gradation value Gg-0, that is, "0" (S23). Next, the display data generation unit 23 determines whether the highest gradation value Gg-1 or "1", or the lowest gradation value Gg-0 or "0" is set for all of the M pixels Px in the image formation space SP in the display data Img (S24). Then, when the result of the determination in step S24 is negative, the display data generation unit 23 advances the process to step S20. On the other hand, when the result of the determination in step S24 is affirmative, the display data generation unit 23 ends the quantization process.

As described above, the recording apparatus 5 forms the image G on the surface SF of the object Obj disposed in the image formation space SP based on the display data Img generated by the quantization process. Specifically, the head controller 61 generates the drive control signal SI that instructs to eject the ink to form a dot for the pixel Px in which the display data Img indicates the highest gradation value Gg-1, that is, "1", and instructs not to eject the ink with no dots for the pixel Px in which the display data Img indicates the lowest gradation value Gg-0, that is, "0". Then, the head unit 7 ejects the ink to the pixel Px in the image formation space SP based on the drive control signal SI. As a result, the recording apparatus 5 forms a dot at the pixel Px in which the display data Img indicates the highest gradation value Gg-1, that is, "1" to form the image G on the surface SF of the object Obj disposed in the image formation space SP.

4. Relationship Between Dither Mask and Display Data

Hereinafter, an example of the dither mask DZ and an example of the generated display data Img according to the present embodiment will be described with reference to FIGS. 10 to 12.

Figure 10:
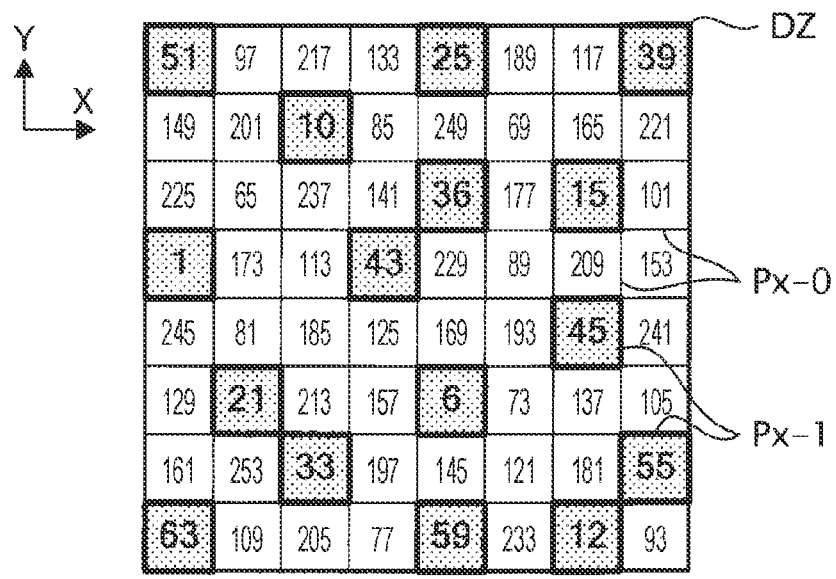
FIG. 10 is an explanatory diagram showing an example of the arrangement of threshold values in the dither mask.

FIG. 10 is an explanatory diagram showing the relationship between the display data Img and the plurality of threshold values Dd corresponding to the plurality of pixels Px located at the plane PL1 of the plurality of threshold values Dd included in the dither mask DZ. Further, FIG. 11 is an explanatory diagram showing the relationship between the display data Img and the plurality of threshold values Dd corresponding to the plurality of pixels Px located at the plane PL2 of the plurality of threshold values Dd included in the dither mask DZ. Further, FIG. 12 is an explanatory diagram showing the relationship between the display data Img and the plurality of threshold values Dd corresponding to the plurality of pixels Px located at the plane PL5 of the plurality of threshold values Dd included in the dither mask DZ. In addition, in FIGS. 10 to 12, each numerical value indicates the threshold value Dd defined at the pixel Px. Further, in FIGS. 10 to 12, the pixel Px surrounded by a thick frame and having dots indicates a dot formation pixel Px-1 in which the formation of the dot is defined by the display data Img.

Figure 11:
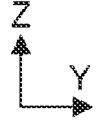
FIG. 11 is an explanatory diagram showing an example of the arrangement of threshold values Dd in the dither mask DZ.
Figure 12:
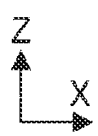
FIG. 12 is an explanatory diagram showing an example of the arrangement of threshold values in the dither mask.

In the examples shown in FIGS. 10 to 12, it is assumed that the plane PL1 is a plane of Z=Z[1], the plane PL2 is a plane of X=X[1], and the plane PL5 is a plane of Y=Y[1]. Further, in the examples shown in FIGS. 10 to 12, it is assumed that the surface SF of the object Obj includes the plane PL1, the plane PL2, and the plane PL5. Further, in the examples shown in FIGS. 10 to 12, it is assumed that Mx=8, My=8, Mz=8, and M=8*8*8=512, so that 512 pixels Px exist in the image formation space SP. Further, in the examples shown in FIGS. 10 to 12, it is assumed that the gradation value Gg-min is "0", the gradation value Gg-max is "255", the threshold value Dd[1] is "1", and the threshold value Dd[M] is "255".

Further, in the following, the gradation near the middle of the gradation value Gg-min and the gradation value Gg-max is referred to as a near midpoint gradation value Gg-mid. Here, the near midpoint gradation value Gg-mid is, for example, a gradation value satisfying the following Equation (9).

$$(1-\gamma 3)*Gg\text{-min}+\gamma 3*Gg\text{-max} \leq Gg\text{-mid} \leq (1-\gamma 4)*Gg\text{-min}+\gamma 4*Gg\text{-max} \qquad (9)$$

where the value $\gamma 3$ is, for example, a real number satisfying $0.2 \leq \gamma 3 \leq 0.5$, and the value $\gamma 4$ is, for example, a real number satisfying $0.5 \leq \gamma 4 \leq 0.8$. In the embodiment, it is assumed that the value $\gamma 3$ is "0.2" and the value $\gamma 4$ is "0.8". That is, in the present embodiment, it is assumed that the near midpoint gradation value Gg-mid satisfies $51 \leq Gg\text{-mid} \leq 204$. Further, in the examples shown in FIGS. 10 to 12, it is assumed that all the gradation values Gg at the plurality of pixels Px indicated by the image data GD are "64", which is the near midpoint gradation values Gg-mid. This corresponds to ¼ of the 256-step gradation value Gg. In the examples shown in FIGS. 10 to 12, it is assumed that all the gradation values Gg at the plurality of pixels Px included in the plane PL1, the plane PL2, and the plane PL5 in the image data GD are the near midpoint gradation values Gg-mid.

As illustrated in FIG. 10, when the gradation value Gg indicated by the image data GD is the near midpoint gradation value Gg-mid, a plurality of dot formation pixels Px-1 of the plurality of pixels Px existing in the plane PL1 is disposed so that it does not exist locally in a specific region and has high dispersibility. In other words, the distribution of the plurality of dot formation pixels Px-1 of the plurality of pixels Px existing in the plane PL1 has the "predetermined spatial frequency characteristic" in the spatial frequency domain. In other words, when the gradation value Gg indicated by the image data GD is the near midpoint gradation value Gg-mid, the distribution of a plurality of dots formed at the plane PL1 is the "predetermined spatial frequency characteristic" in the spatial frequency domain Here, "the distribution of a plurality of dots has a predetermined spatial frequency characteristic in one plane" means the curve showing the relationship between the spatial frequency of the one plane obtained by performing a two-dimensional Fourier transform on the dot formation pixels Px-1 of the plurality of pixels Px, and the amount of each frequency component of the one plane in the spatial frequency domain has the above-mentioned predetermined spatial frequency characteristic. Also, "the distribution of a plurality of dots has a predetermined spatial frequency characteristic in one plane" can also be grasped such that when a curved surface in which a value indicating whether a dot is formed in each of a plurality of pixels Px located at one plane by which the image formation space SP is cut is expressed as the height from the bottom face when the one plane is regarded as the base is generated, the curve showing the relationship between the spatial frequency of the curved surface and the amount of each frequency component of the curved surface in the spatial frequency domain has a predetermined spatial frequency characteristic.

Similarly, as illustrated in FIG. 11, when the gradation value Gg indicated by the image data GD is the near midpoint gradation value Gg-mid, a plurality of dot formation pixels Px-1 of the plurality of pixels Px existing in the plane PL2 is disposed so that it does not exist locally in a specific region and has high dispersibility. In other words, the distribution of the plurality of dot formation pixels Px-1 of the plurality of pixels Px existing in the plane PL2 has the "predetermined spatial frequency characteristic" in the spatial frequency domain. In other words, when the gradation value Gg indicated by the image data GD is the near midpoint gradation value Gg-mid, the distribution of a plurality of dots formed at the plane PL2 is the "predetermined spatial frequency characteristic" in the spatial frequency domain. Similarly, as illustrated in FIG. 12, when the gradation value Gg indicated by the image data GD is the near midpoint gradation value Gg-mid, a plurality of dot formation pixels Px-1 of the plurality of pixels Px existing in the plane PL5 is disposed so that it does not exist locally in a specific region and has high dispersibility. In other words, the distribution of the plurality of dot formation pixels Px-1 of the plurality of pixels Px existing in the plane PL5 has the "predetermined spatial frequency characteristic" in the spatial frequency domain. In other words, when the gradation value Gg indicated by the image data GD is the near midpoint gradation value Gg-mid, the distribution of a plurality of dots formed at the plane PL5 is the "predetermined spatial frequency characteristic" in the spatial frequency domain.

As mentioned above, according to the embodiment, as illustrated in FIGS. 10 to 12, since the threshold value distribution of the dither mask DZ has a predetermined spatial frequency characteristic, the distribution of a plurality of dots formed on the surface SF of the object Obj located in the image formation space SP also has the predetermined spatial frequency characteristic when the gradation value Gg indicated by the image data GD is the near midpoint gradation value Gg-mid. In other words, according to the present embodiment, when the gradation value Gg indicated by the image data GD is the near midpoint gradation value Gg-mid, the dispersibility of a plurality of dots formed on the surface SF of the object Obj Can be increased.

5. Reference Example and Effect of the Present Embodiment as Compared with Reference Example Hereinafter, with reference to FIGS. 13 to 21, the dither mask according to Reference Example and the effect of the present embodiment as compared with Reference Example will be described.

In the examples shown in FIGS. 13 to 21, it is assumed that Mx=3, My=3, Mz=3, and M=3*3*3=27, and 27 pixels Px exist in the image formation space SP. Further, in the examples shown in FIGS. 13 to 21, it is assumed that the gradation value Gg-min is "0", the gradation value Gg-max is "9", and the threshold value Dd[1] is "1", and the threshold value Dd[M] is "9". Further, in the examples shown in FIGS. 13 to 21, it is assumed that the near midpoint gradation value Gg-mid satisfies 2≤Gg-mid≤7. Further, in the examples shown in FIGS. 13 to 21, it is assumed that the gradation values Gg at the plurality of pixels Px indicated by the image data GD are all "4". That is, in the examples shown in FIGS. 13 to 21, it is assumed that all the gradation values Gg at the plurality of pixels Px indicated by the image data GD are the near midpoint gradation values Gg-mid.

Figure 13:
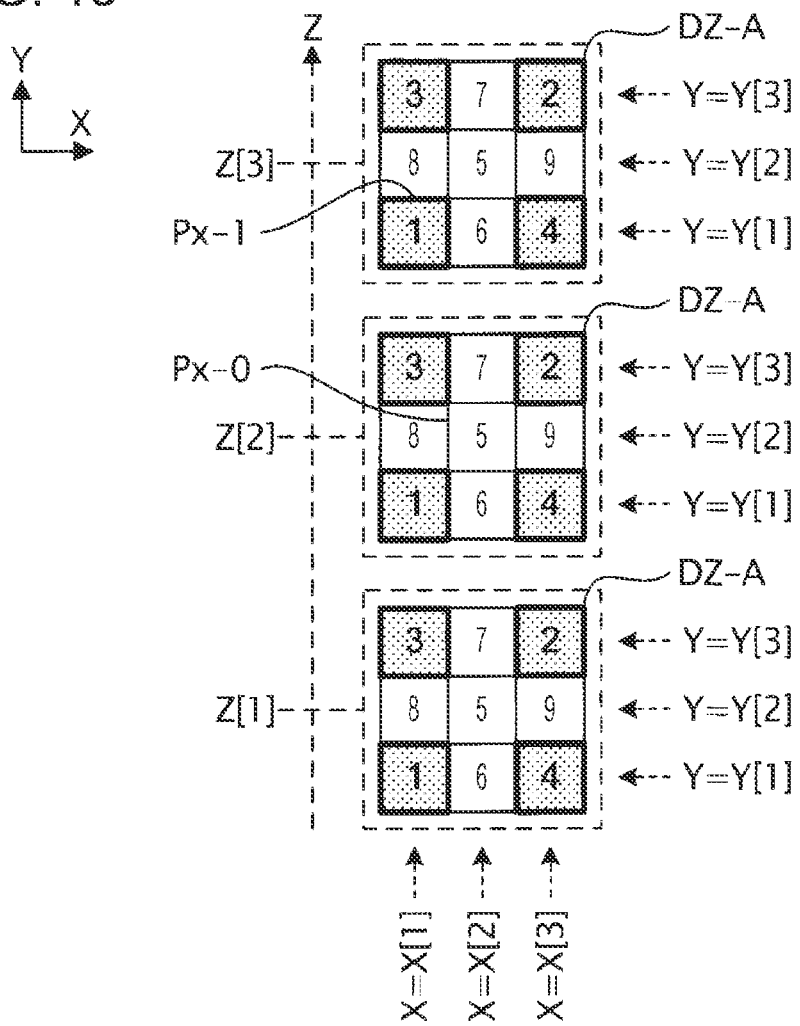
FIG. 13 is an explanatory diagram showing an example of a dither mask DZ-A according to Reference Example 1.
Figure 14:
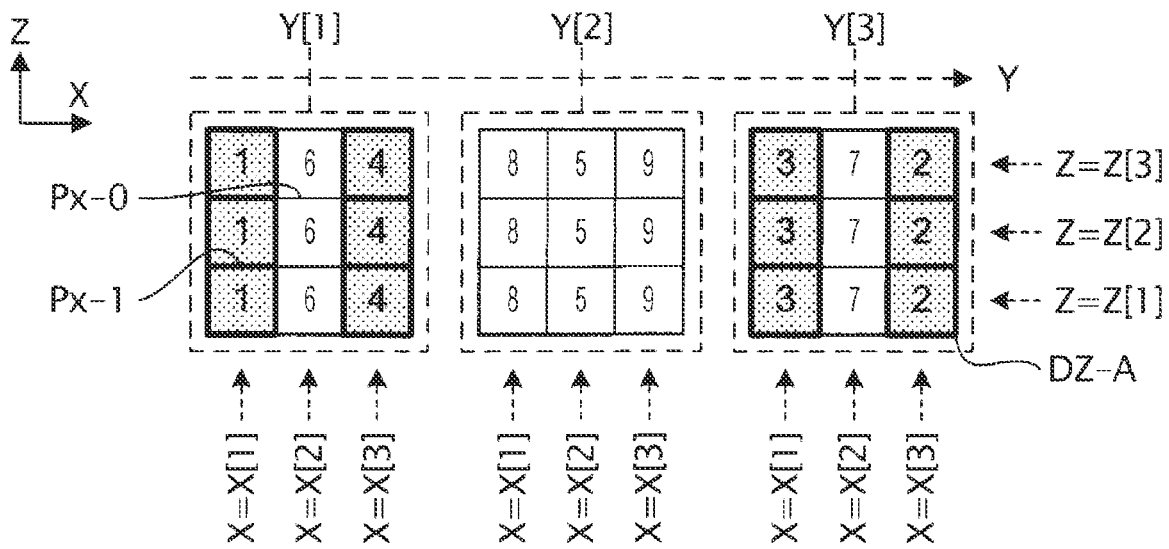
FIG. 14 is an explanatory diagram showing an example of the dither mask according to Reference Example 1.
Figure 15:
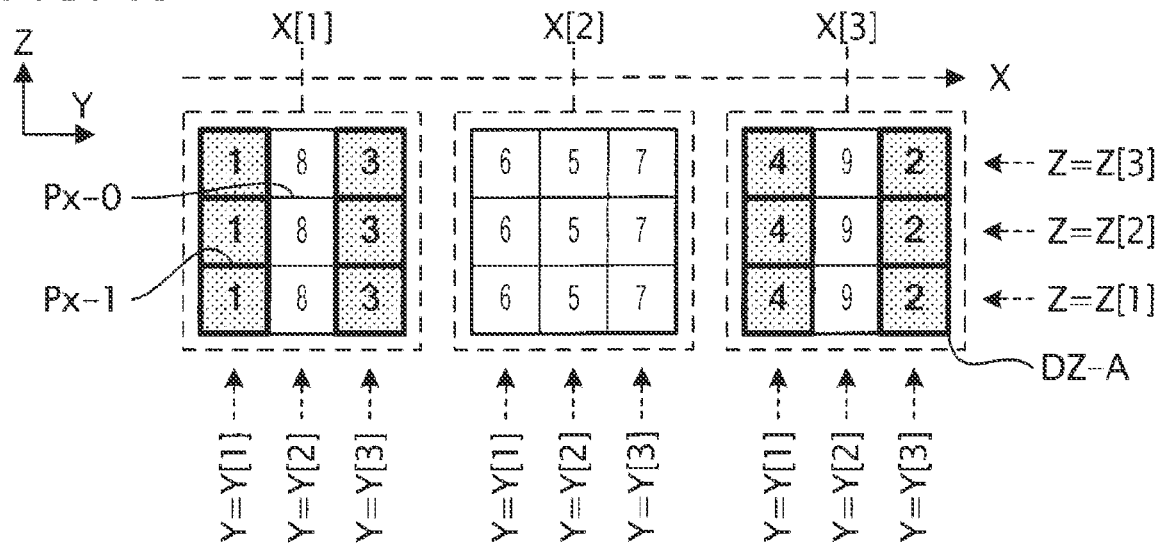
FIG. 15 is an explanatory diagram showing an example of the dither mask according to Reference Example 1.

FIGS. 13 to 15 are explanatory diagrams for explaining Reference Example 1.

Reference Example 1 uses a two-dimensional dither mask DZ-A in which a plurality of threshold values corresponding to a plurality of pixels Px in a two-dimensional space is defined. The dither mask DZ-A extends in a direction parallel to the XY plane. The dither mask DZ-A is set to have a predetermined spatial frequency characteristic in the spatial frequency domain so that the dots can be disposed in a dispersed manner. Here, in Reference Example 1, the same dither mask DZ-A is used for the three planes of the plane Z=Z[1], the plane Z=Z[2], and the plane Z=Z[3]. In Reference Example 1, the two-dimensional quantization process is performed on each of the plane Z=Z[1], the plane Z=Z[2], and the plane Z=Z[3] using the dither mask DZ-A.

As illustrated in FIG. 13, the dither mask DZ-A has a plurality of threshold values Dd disposed to have a predetermined spatial frequency characteristic in the plane Z=Z[1]. That is, the dither mask DZ-A can dispose a plurality of dot formation pixels Px-1 in the plane Z=Z[1] so as to have a predetermined spatial frequency characteristic in the spatial frequency domain. Therefore, in Reference Example 1, when the surface SF of the object Obj includes the plane Z=Z[1], the recording apparatus 5 can dispose the dots in the plane Z=Z[1] in a dispersed manner. Further, the dither mask DZ-A has a plurality of threshold values Dd having the arrangement same as that of the plane Z=Z[1] in the plane Z=Z[2]. Therefore, in Reference Example 1, when the surface SF of the object Obj includes the plane Z=Z[2], the recording apparatus 5 can dispose the dots in the plane Z=Z[2] in a dispersed manner. Further, the dither mask DZ-A has a plurality of threshold values Dd having the arrangement same as that the plane Z=Z[1] in the plane Z=Z[3]. Therefore, in Reference Example 1, when the surface SF of the object Obj includes the plane Z=Z[3], the recording apparatus 5 can dispose the dots in the plane Z=Z[3] in a dispersed manner.

On the other hand, the quantization process is performed on each of the plane Y=Y[1], the plane Y=Y[2], the plane Y=Y[3], the plane X=X[1], the plane X=X[2], and the plane X=X[3] using three two-dimensional dither masks DZ-A in a division manner.

For example, as illustrated in FIG. 14, the quantization process is performed on the three pixels located at the plane Z=Z[1] using the two-dimensional dither mask DZ-A corresponding to the plane Z=Z[1], the quantization process is performed on the three pixels located at the plane Z=Z[2] using the two-dimensional dither mask DZ-A corresponding to the plane Z=Z[2], and the quantization process is performed on the three pixels located at the plane Z=Z[3] using the two-dimensional dither mask DZ-A corresponding to the plane Z=Z[3] of the nine pixels in the plane Y=Y[1]. As described above, since the same three dither masks DZ-A are used in Reference Example 1, the three pixels located at the plane Z=Z[1], the three pixels located at the plane Z=Z[2], and the three pixels located at the plane Z=Z[3] of the nine pixels in the plane Y=Y[1] have the same threshold value. Therefore, in Reference Example 1, as shown in FIG. 14, in the plane Y=Y[1], dots are continuously formed at the three pixels of the plane X=X[1] and the three pixels of the plane X=X[3], while no dots are formed at the three pixels of the plane X=X[2]. Therefore, in Reference Example 1, when the surface SF of the object Obj includes the plane Y=Y[1], the recording apparatus 5 can not dispose the dots in the plane Y=Y[1] in a dispersed manner. As can be seen in the same way, in Reference Example 1, as shown in FIG. 14, no dots are formed at the nine pixels in the plane Y=Y[2]. Therefore, in Reference Example 1, when the surface SF of the object Obj includes the plane Y=Y[2], the recording apparatus 5 can not dispose the dots in the plane Y=Y[2]. As can be seen in the same way, in Reference Example 1, as shown in FIG. 14, in the plane Y=Y[3], dots are continuously formed at the three pixels of the plane X=X[1] and the three pixels of the plane X=X[3], while no dots are formed at the three pixels of the plane X=X[2]. Therefore, in Reference Example 1, when the surface SF of the object Obj includes the plane Y=Y[3], the recording apparatus 5 can not dispose the dots in the plane Y=Y[3] in a dispersed manner.

As can be seen in the same way, in Reference Example 1, as shown in FIG. 15, in the plane X=X[1], dots are continuously formed at the three pixels of the plane Y=Y[1] and the three pixels of the plane Y=Y[3], while no dots are formed at the three pixels of the plane Y=Y[2]. Therefore, in Reference Example 1, when the surface SF of the object Obj includes the plane X=X[1], the recording apparatus 5 can not dispose the dots in the plane X=X[1] in a dispersed manner. As can be seen in the same way, in Reference Example 1, as shown in FIG. 15, no dots are formed at the nine pixels in the plane X=X[2]. Therefore, in Reference Example 1, when the surface SF of the object Obj includes the plane X=X[2], the recording apparatus 5 can not dispose the dots in the plane X=X[2]. As can be seen in the same manner, as shown in FIG. 15, in the plane X=X[3], dots are continuously formed at the three pixels of the plane Y=Y[1] and the three pixels of the plane Y=Y[3], while no dots are formed at the three pixels of the plane Y=Y[2]. In Reference Example 1, when the surface SF of the object Obj includes the plane X=X[3], the recording apparatus 5 can not dispose the dots in the plane X=X[3] in a dispersed manner.

As described above, in Reference Example 1, the same two-dimensional dither masks DZ-A extending in a direction parallel to the XY plane are respectively applied to the plane Z=Z[1], the plane Z=Z[2], and the plane Z=Z[3] to generate the display data. For this reason, in Reference Example 1, for the recording apparatus 5, when the surface SF of the object Obj is parallel to the XY plane, the recording apparatus 5 can dispose the dots on the surface SF in a dispersed manner, but when the surface SF of the object Obj is not parallel to the XY plane, the recording apparatus 5 can not control the placement of the dots on the surface SF, and as a result, the dots are disposed continuously, and it is no possible dispose the dots in a dispersed manner. Therefore, in Reference Example 1, the image G formed on the surface SF of the object Obj has a grainy appearance, and the image quality of the image G deteriorates. Further, in planes parallel to each other, the planes (the plane X=X[1], the plane X=X[3], the plane Y=Y[1], and plane Y=Y[3]) in which dots are concentratedly disposed, and the planes (the plane X=X[2] and the plane Y=Y[2]) in which no dots are disposed coexist, and the image quality greatly differs depending on the surface SF of the object Obj.

Figure 16:
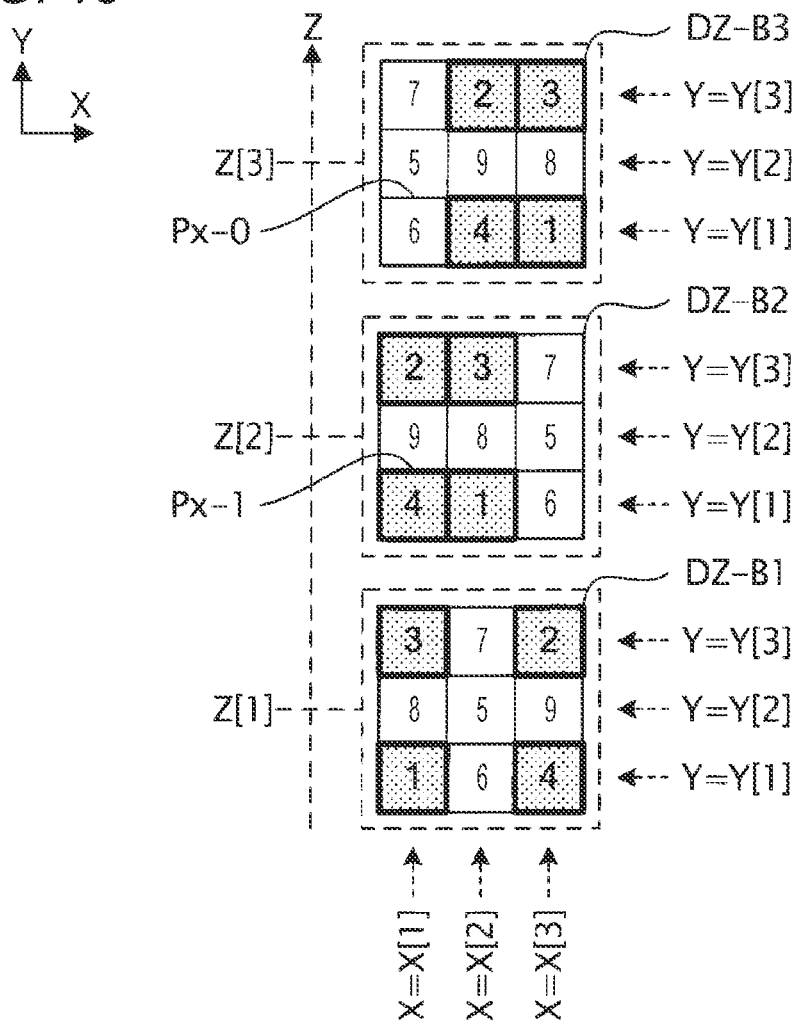
FIG. 16 is an explanatory diagram showing an example of the dither mask according to Reference Example 2.
Figure 17:
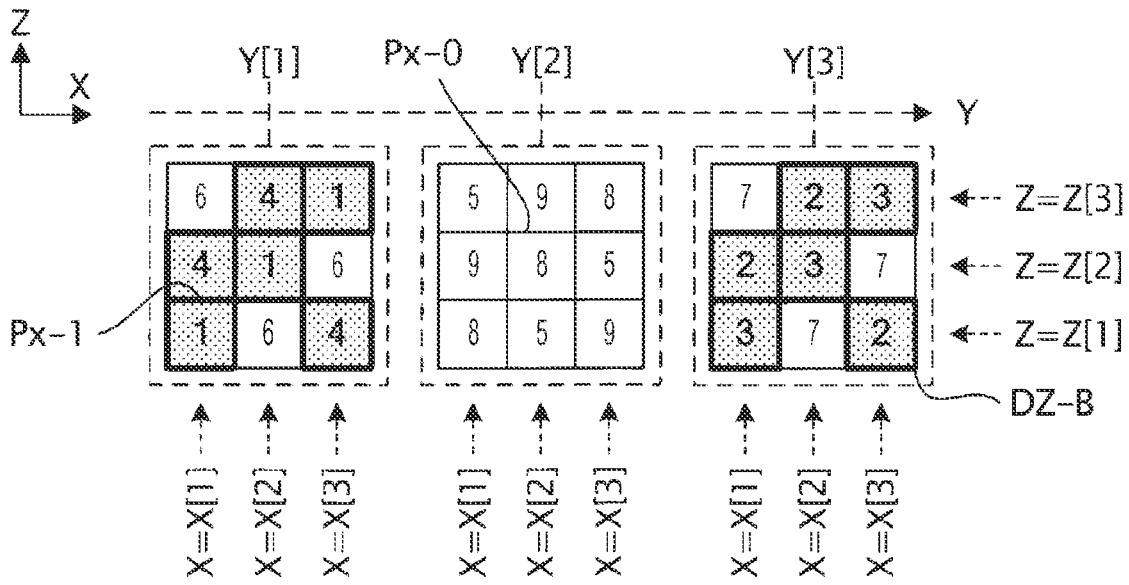
FIG. 17 is an explanatory diagram showing an example of the dither mask according to Reference Example 2.
Figure 18:
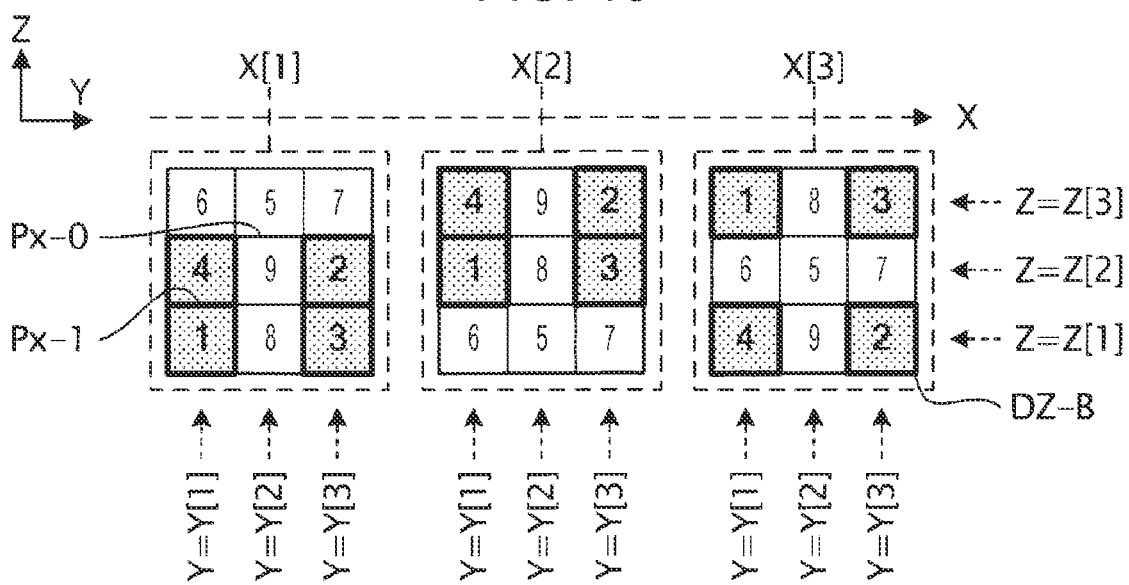
FIG. 18 is an explanatory diagram showing an example of the dither mask according to Reference Example 2.

FIGS. 16 to 18 are explanatory diagrams for explaining Reference Example 2.

Reference Example 2 uses a two-dimensional dither mask DZ-B1 in which a plurality of threshold values corresponding to a plurality of pixels Px in a two-dimensional space is defined for the plane Z=Z[1]. The dither mask DZ-B1 extends in a direction parallel to the XY plane. The dither mask DZ-B1 is set to have a predetermined spatial frequency characteristic in the spatial frequency domain so that the dots can be disposed in a dispersed manner. Further, a dither mask DZ-B2 in which the plurality of threshold values Dd that the dither mask DZ-B1 has are slid by one pixel in the +X direction is used for the plane Z=Z[2]. Specifically, the dither mask DZ-B2 is a dither mask in which a plurality of threshold values Dd in the plane X=X[1] is slid to the plane X=X[2], a plurality of threshold values Dd in the plane X=X[2] is slid to the plane X=X[3], and a plurality of threshold values Dd in the plane X=X[3] is slid to the plane X=X[1] in the dither masks DZ-B1. Further, a dither mask DZ-B3 in which the plurality of threshold values Dd that the dither mask DZ-B1 has is slid by two pixels in the +X direction is used for the plane Z=Z[3]. Specifically, the dither mask DZ-B3 in which a plurality of threshold values Dd in the plane X=X[1] is slid to the plane X=X[3], a plurality of threshold values Dd in the plane X=X[2] is slid to the plane X=X[1], and a plurality of threshold values Dd in the plane X=X[3] is slid to the plane X=X[2] in the dither masks DZ-B1 is used. In Reference Example 2, the two-dimensional quantization process is performed on the plane Z=Z[1] using the dither mask DZ-B1, the plane Z=Z[2] using the dither mask DZ-B2, and the plane Z=Z[3] using the dither mask DZ-B3.

As illustrated in FIG. 16, the dither mask DZ-B1 has a plurality of threshold values Dd disposed to have a predetermined spatial frequency characteristic in the plane Z=Z[1]. That is, the dither mask DZ-B1 can dispose a plurality of dot formation pixels Px-1 in the plane Z=Z[1] so as to have a predetermined spatial frequency characteristic in the spatial frequency domain. Therefore, in Reference Example 2, when the surface SF of the object Obj includes the plane Z=Z[1], the recording apparatus 5 can dispose the dots in the plane Z=Z[1] in a dispersed manner. On the other hand, the dither mask DZ-B2 is a dither mask in which a plurality of threshold values Dd that the dither mask DZ-B1 has are slid as described above. As a result, the dither mask DZ-B2 does not have a predetermined spatial frequency characteristic in the spatial frequency domain. Therefore, in Reference Example 2, when the surface SF of the object Obj includes the plane Z=Z[2], the dispersibility of the dots formed by the recording apparatus 5 in the plane Z=Z[2] is lower than the dispersibility of the dots formed by the recording apparatus 5 in the plane Z=Z[1]. Further, the dither mask DZ-B3 is a dither mask obtained by sliding a plurality of threshold values Dd that the dither mask DZ-B1 has as described above. As a result, the dither mask DZ-B3 does not have a predetermined spatial frequency characteristic in the spatial frequency domain. Therefore, in Reference Example 2, when the surface SF of the object Obj includes the plane Z=Z[3], the dispersibility of the dots formed by the recording apparatus 5 in the plane Z=Z[3] is lower than the dispersibility of the dots formed by the recording apparatus 5 in the plane Z=Z[1].

On the other hand, as in Reference Example 1, the quantization process is performed on the plane Y=Y[1], the plane Y=Y[2], the plane Y=Y[3], the plane X=X[1], the plane X=X[2], and the plane X=X[3] using the two-dimensional dither mask DZ-B1, the two-dither mask DZ-B2, and the two-dither mask DZ-B3 in a division manner.

For example, as illustrated in FIG. 17, the quantization process is performed on the three pixels located at the plane Z=Z[1] using the two-dimensional dither mask DZ-B1 corresponding to the plane Z=Z[1], the quantization process is performed on the three pixels located at the plane Z=Z[2] using the two-dimensional dither mask DZ-B2 corresponding to the plane Z=Z[2], and the quantization process is performed on the three pixels located at the plane Z=Z[3] using the two-dimensional dither mask DZ-B3 corresponding to the plane Z=Z[3] of the nine pixels in the plane Y=Y[1]. Here, the three pixels located at the plane Y=Y[1] and located at the plane Z=Z[1] corresponds to the threshold values Dd of "1", "6", "4" that the dither mask DZ-B1 has in order from the −X direction to the +X direction. Further, the three pixels located at the plane Y=Y[1] and located at the plane Z=Z[2] corresponds to the threshold values Dd of "4", "1", "6" that the dither mask DZ-B2 has in order from the −X direction to the +X direction. Further, the three pixels located at the plane Y=Y[1] and located at the plane Z=Z[3] corresponds to the threshold values Dd of "6", "4", "1" that the dither mask DZ-B3 has in order from the −X direction to the +X direction. Therefore, in Reference Example 2, as shown in FIG. 17, the dispersibility of the dots in the plane Y=Y[1] is higher than that in the plane Y=Y[1] in FIG. 14. However, the plane Y=Y[1] of FIG. 17 has a large number of dots to be disposed and the low dispersibility of the dots, as compared with the plane Y=Y[1] of FIG. 20 described later. That is, the plane Y=Y[1] in FIG. 17 has not reached the preferable dispersibility like the plane Y=Y[1] in FIG. 20 described later. As can be seen from the same consideration, in Reference Example 2, as shown in FIG. 17, no dots are formed at the nine pixels in the plane Y=Y[2]. Therefore, in Reference Example 2, when the surface SF of the object Obj includes the plane Y=Y[2], the recording apparatus 5 can not dispose the dots in the plane Y=Y[2]. As can be seen in the same manner, in Reference Example 2, as shown in FIG. 17, the plane Y=Y[3] has a higher dot dispersibility than the plane Y=Y[3] in FIG. 14, but a lower dot dispersibility than the plane Y=Y[3] in FIG. 20, which will be described later. Therefore, in Reference Example 2, when the surface SF of the object Obj includes the plane Y=Y[3], the recording apparatus 5 can not dispose the dots sufficiently in the plane Y=Y[3] in a dispersed manner.

As can be seen in the same manner, in Reference Example 2, as shown in FIG. 18, the plane X=X[1] has a higher dot dispersibility than the plane X=X[1] in FIG. 15, but a lower dot dispersibility than the plane X=X[1] in FIG. 21, which will be described later. Therefore, in Reference Example 2, when the surface SF of the object Obj includes the plane X=X[1], the recording apparatus 5 can not dispose the dots sufficiently in the plane X=X[1] in a dispersed manner. As can be seen in the same manner, in Reference Example 2, as shown in FIG. 18, the plane X=X[2] has a higher dot dispersibility than the plane X=X[2] in FIG. 15, but a lower dot dispersibility than the plane X=X[2] in FIG. 21, which will be described later. Therefore, in Reference Example 2, when the surface SF of the object Obj includes the plane X=X[2], the recording apparatus 5 can not dispose the dots sufficiently in the plane X=X[2] in a dispersed manner. In Reference Example 2, as shown in FIG. 18, the plane X=X[3] can have a sufficiently high dot dispersibility. Therefore, in Reference Example 2, when the surface SF of the object Obj includes the plane X=X[3], the recording apparatus 5 can dispose the dots in the plane X=X[3] in a dispersed manner. However, in Reference Example 2, the planes other than the plane X=X[3] and the plane Z=Z[1] have a low dot dispersibility, and it is unlikely that the dots are disposed on the surface SF of the object Obj in a sufficiently dispersed manner.

As mentioned above, in Reference Example 2, the two-dimensional dither mask DZ-B1 extending in a direction parallel to the XY plane is applied to the plane Z=Z[1], the two-dimensional dither mask DZ-B2 having the threshold values obtained by sliding a plurality of threshold values Dd that the dither mask DZ-B1 has is applied to a plane Z=Z[2], and the two-dimensional dither mask DZ-B3 having the threshold values obtained by sliding a plurality of threshold values Dd that the dither mask DZ-B1 has is applied to the plane Z=Z[3] to generate the display data. Therefore, in Reference Example 2, the recording apparatus 5 may not be able to dispose the dots on the surface SF in a sufficiently dispersed manner. Therefore, in Reference Example 2, the image G formed on the surface SF of the object Obj has a grainy appearance, and the image quality of the image G deteriorates.

Figure 19:
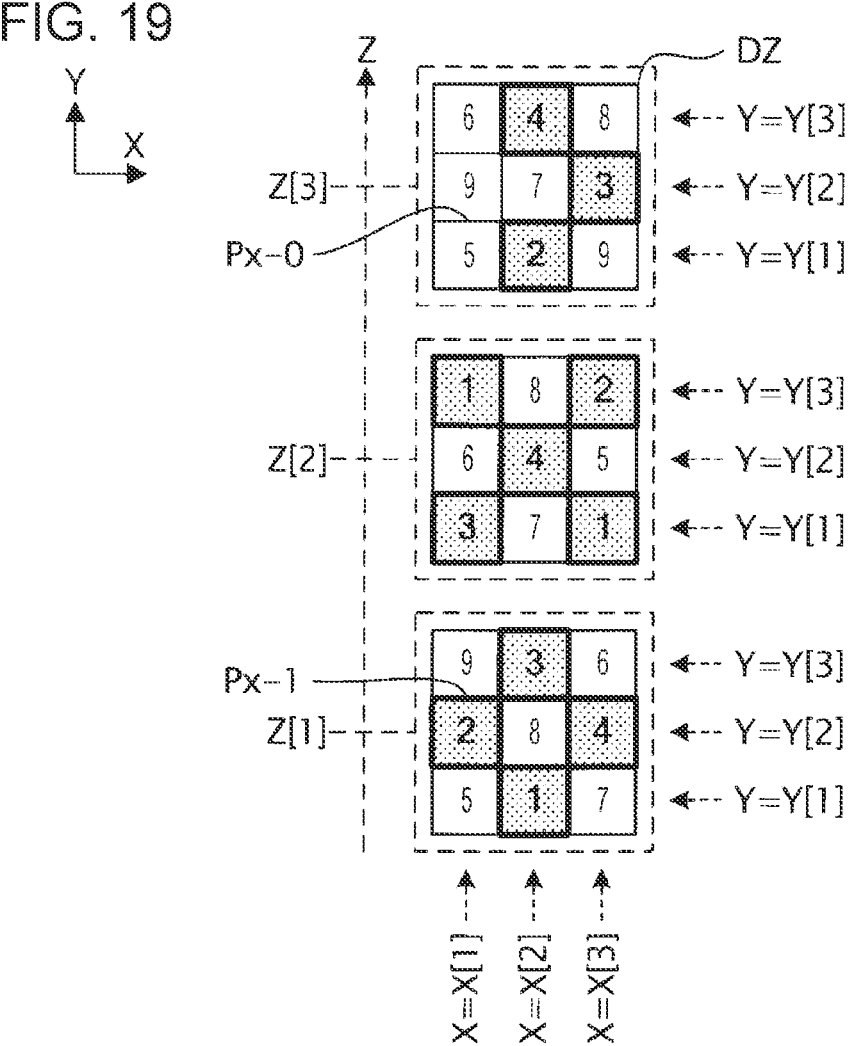
FIG. 19 is an explanatory diagram showing an example of the dither mask.
Figure 20:
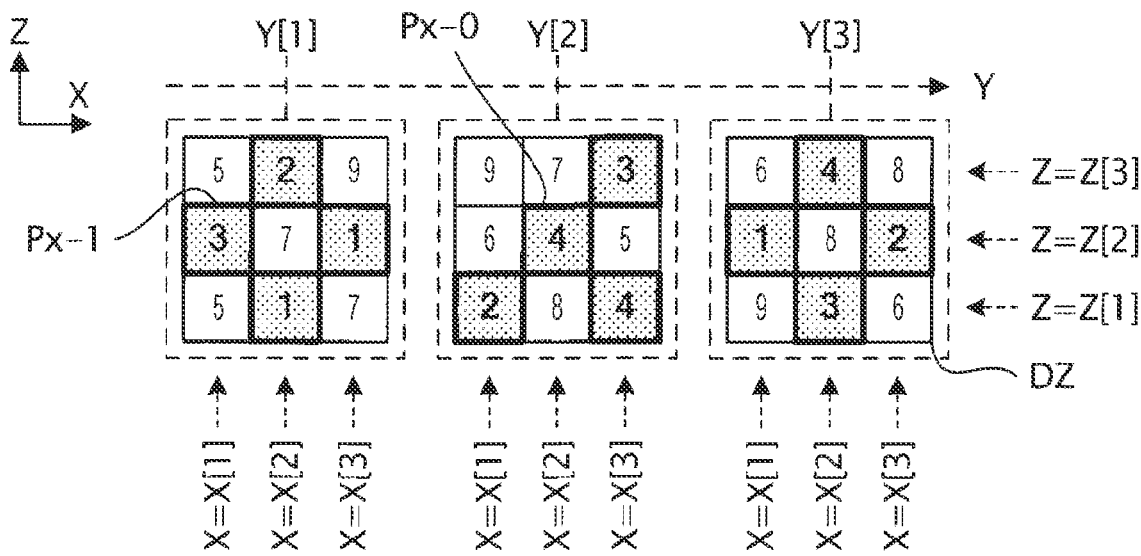
FIG. 20 is an explanatory diagram showing an example of the dither mask.
Figure 21:
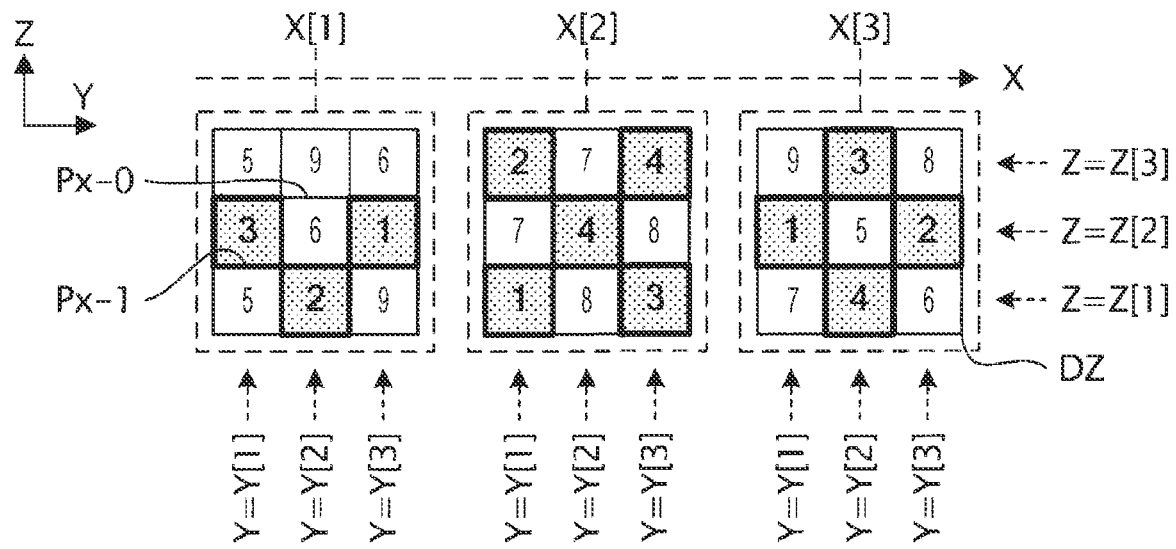
FIG. 21 is an explanatory diagram showing an example of the dither mask.

FIGS. 19 to 21 are explanatory diagrams for explaining the dither mask DZ according to the present embodiment. As described above, unlike Reference Example 1 and Reference Example 2 in which the two-dimensional dither mask is applied, the three-dimensional dither mask DZ is applied in the present embodiment.

As illustrated in FIGS. 19 to 21, the dither mask DZ has a plurality of threshold values Dd disposed so as to have a predetermined spatial frequency characteristic in any plane of the plane Z=Z[1], the plane Z=Z[2], the plane Z=Z[3], the plane Y=Y[1], the plane Y=Y[2], the plane Y=Y[3], the plane X=X[1], the plane X=X[2], and the plane X=X[3]. That is, the dither mask DZ can dispose a plurality of dot formation pixels Px-1 in each plane of the plane Z=Z[1], the plane Z=Z[2], the plane Z=Z[3], the plane Y=Y[1], the plane Y=Y[2], the plane Y=Y[3], the plane X=X[1], the plane X=X[2], and the plane X=X[3] in the spatial frequency domain so as to have a predetermined spatial frequency characteristic. For this reason, in the embodiment, when the surface SF of the object Obj includes each plane of the plane Z=Z[1], the plane Z=Z[2], the plane Z=Z[3], the plane Y=Y[1], the plane Y=Y[2], the plane Y=Y[3], the plane X=X[1], the plane X=X[2], and the plane X=X[3], the recording apparatus 5 can dispose the dots in the planes in a dispersed manner. Therefore, as compared with the above-mentioned Reference Example 1 and Reference Example 2, in the present embodiment, the graininess in the image G formed on the surface SF of the object Obj can be reduced, and it is possible to suppress deterioration of the image quality of the image G.

6. Summary of Embodiments

As explained in the above, the terminal device 1 according to the present embodiment includes the image data acquisition unit 21 that acquires the image data GD indicating the gradation value Gg of the image Gf to be displayed by each of the M pixels Px in the image formation space SP when representing the image Gf in the three-dimensional image formation space SP, and the display data generation unit 23 that generates display data Img by quantizing the gradation value Gg indicated by the image data GD using the three-dimensional dither mask DZ having M threshold values Dd corresponding to M pixels Px in the image formation space SP, wherein, in the dither mask DZ, when the image formation space SP is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. That is, in the terminal device 1 according to the present embodiment, the display data generation unit 23 generates the display data Img by quantizing the gradation value Gg indicated by the image data GD using a dither mask DZ having a predetermined spatial frequency characteristic in the plane PL1 and having a predetermined spatial frequency characteristic in the plane PL2 extending in a direction different from that of the plane PL1. Therefore, according to the present embodiment, when the image G having a three-dimensional shape having the plane PL1 and the plane PL2 is formed, it is possible to suppress the occurrence of graininess in the image G. That is, according to the present embodiment, when the image G having a three-dimensional shape having the plane PL1 and the plane PL2 is formed, it is possible to suppress deterioration of the image quality of the image G due to the occurrence of graininess in the image G. In addition, in the embodiment, the terminal device 1 is an example of the "image processing device", the image data acquisition unit 21 is an example of the "acquisition unit", the display data generation unit 23 is an example of the "generation unit", the image formation space SP is an example of the "first space", the image data GD is an example of the "first image data", the dither mask DZ is an example of the "first dither mask", display data Img is an example of the "first display data", the intermediate frequency fmid is an example of the "predetermined frequency", the plane PL1 is an example of the "first plane", and the plane PL2 is an example of the "second plane".

Further, in the terminal device 1 according to the present embodiment, the configuration may be characterized in that, in the dither mask DZ, when the image formation space SP is cut by the plane PL3 parallel to the plane PL1, a plurality of threshold values Dd in the plane PL3 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL4 parallel to the plane PL2, a plurality of threshold values Dd in the plane PL4 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. Therefore, according to the present embodiment, when the image G having a three-dimensional shape having the plane PL1, the plane PL2, the plane PL3, and the plane PL4 is formed, it is possible to suppress the occurrence of graininess in the image G. In the present embodiment, the plane PL3 is an example of the "third plane", and the plane PL4 is an example of the "fourth plane".

Further, in the terminal device 1 according to the present embodiment, the configuration may be characterized in that, in the dither mask DZ, when the image formation space SP is cut by any plane parallel to the plane PL1, a plurality of threshold values Dd in the any plane has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by any plane parallel to the plane PL2, a plurality of threshold values Dd in the any plane has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. Therefore, according to the present embodiment, when the image G having a three-dimensional shape having the plane parallel to the plane PL1 and the plane parallel to the plane PL2 is formed, it is possible to suppress the occurrence of graininess in the image G.

Further, in the terminal device 1 according to the present embodiment, the configuration may be characterized in that, in the dither mask DZ, when the image formation space SP is cut by the plane PL5 extending in a direction different from those of the plane PL1 and the plane PL2, a plurality of threshold values Dd in the plane PL5 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. Therefore, according to the present embodiment, when the image G having a three-dimensional shape having the plane PL1, the plane PL2, and the plane PL5 is formed, it is possible to suppress the occurrence of graininess in the image G. In the embodiment, the plane PL5 is an example of the "fifth plane".

Further, in the terminal device 1 according to the present embodiment, the configuration may be characterized in that, in the dither mask DZ, when the image formation space SP is cut by the plane PL6 parallel to the plane PL5, a plurality of threshold values Dd in the plane PL6 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain Therefore, according to the present embodiment, when the image G having a three-dimensional shape having the plane PL1, the plane PL2, the plane PL5, and the plane PL6 is formed, it is possible to suppress the occurrence of graininess in the image G. In the embodiment, the plane PL6 is an example of the "sixth plane".

Further, in the terminal device 1 according to the present embodiment, the configuration may be characterized in that, in the dither mask DZ, when the image formation space SP is cut by any plane parallel to the plane PL5, a plurality of threshold values Dd in the any plane has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain Therefore, according to the present embodiment, when the image G having a three-dimensional shape having the plane parallel to the plane PL1, the plane parallel to the plane PL2, and the plane parallel to the plane PL5 is formed, it is possible to suppress the occurrence of graininess in the image G.

Further, in the terminal device 1 according to the present embodiment, the configuration may be characterized in that M pixels Px in the image formation space SP include Mx pixels Px disposed so as to extend in the +X direction, My pixels Px disposed so as to extend in the +Y direction orthogonal to the +X direction, and Mz pixels Px disposed so as to extend in the +Z direction orthogonal to the +X direction and the +Y direction, wherein the plane PL1 is a plane having a normal vector extending in a direction perpendicular to the +X direction, and the plane PL2 is a plane having a normal vector extending in a direction perpendicular to the +Y direction. Therefore, according to the present embodiment, when the image G having a three-dimensional shape having the plane parallel to the +X direction and the plane parallel to the +Y direction is formed, it is possible to suppress the occurrence of graininess in the image G. In the present embodiment, the +X direction is an example of the "first direction", the +Y direction is an example of the "second direction", and the +Z direction is an example of the "third direction".

Further, in the terminal device 1 according to the present embodiment, the configuration may be characterized in that the plane PL1 is a plane having a normal vector extending in the direction perpendicular to the +Y direction, and the plane PL2 is a plane having a normal vector extending in the direction perpendicular to the +Z direction. Therefore, according to the present embodiment, when the image G having a three-dimensional shape having the plane parallel to the XY plane and the plane parallel to the YZ plane is formed, it is possible to suppress the occurrence of graininess in the image G.

Further, in the terminal device 1 according to the present embodiment, the configuration may be characterized in that a plurality of threshold value Dd in the plane PL1 has a frequency characteristic different from a white noise characteristic in the spatial frequency domain, and wherein a plurality of threshold values Dd in the plane PL2 has a frequency characteristic different from a white noise characteristic in the spatial frequency domain. Specifically, in the terminal device 1 according to the present embodiment, the configuration may be characterized in that the plurality of threshold value Dd in the plane PL1 has a blue noise characteristic in the spatial frequency domain, and the plurality of threshold values Dd in the plane PL2 has a blue noise characteristic in the spatial frequency domain. Therefore, according to the present embodiment, when the image G having a three-dimensional shape is formed, it is possible to suppress the occurrence of graininess in the image G.

Further, in the terminal device 1 according to the present embodiment, the configuration may be characterized in that the display data generation unit 23 supplies the display data Img to the recording apparatus 5 including the head unit 7 that ejects the ink based on the display data Img.

Further, in the recording apparatus 5 according to the present embodiment, the recording apparatus 5 that forms the image G with on the object Obj having a three-dimensional shape includes the head unit 7 that ejects the ink, and the recording control unit 6 that controls ink ejection from the head unit 7 so that the image G is formed on the object Obj by a plurality of dots formed by the ink ejected from the head unit 7, wherein the recording control unit 6 performs control so that when the object Obj has the first face, the distribution of a plurality of dots on the first face has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the object Obj has a second face extending in a direction different from that of the first face, the distribution of a plurality of dots on the second face has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. Therefore, according to the present embodiment, when the image G is formed on the object Obj having a three-dimensional shape having the first face and the second face, it is possible to suppress the occurrence of graininess in the image G. That is, according to the present embodiment, when the image G having a three-dimensional shape having the first face and the second face is formed, it is possible to suppress deterioration of image quality of the image G due to the occurrence of graininess in the image G. In the present embodiment, the recording control unit 6 is an example of the "controller", and the ink is an example of the "liquid".

Further, in the recording apparatus 5 according to the present embodiment, the configuration may be characterized in that the distribution of the plurality of dots on the first face has a frequency characteristic different from a white noise characteristic in the spatial frequency domain, and the distribution of the plurality of dots on the second face has a frequency characteristic different from a white noise characteristic in the spatial frequency domain. Specifically, in the recording apparatus 5 according to the present embodiment, the configuration may be characterized in that the distribution of the plurality of dots on the first face has a blue noise characteristic in the spatial frequency domain, and the distribution of the plurality of dots on the second face has a blue noise characteristic in the spatial frequency domain. Therefore, according to the present embodiment, when the image G is formed on the object Obj having a three-dimensional shape having the first face and the second face, it is possible to suppress the occurrence of graininess in the image G.

Further, the image processing method according to the present embodiment includes a process of acquiring the image data GD indicating the gradation value Gg of the image Gf to be displayed by each of the M pixels Px in the image formation space SP when representing the image Gf in the three-dimensional image formation space SP, and a process of generating the display data Img by quantizing the gradation value Gg indicated by the image data GD using the three-dimensional dither mask DZ having M threshold values Dd corresponding to M pixels Px in the image formation space SP, wherein, in the dither mask DZ, when the image formation space SP is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain Therefore, according to the present embodiment, when the image G having a three-dimensional shape having the plane PL1 and the plane PL2 is formed, it is possible to suppress the occurrence of graininess in the image G.

Further, the control program Pgt according to the present embodiment causes one or a plurality of CPUs provided in the terminal device 1 to function as the image data acquisition unit 21 that acquires the image data GD indicating the gradation value Gg of the image Gf to be displayed by each of the M pixels Px in the image formation space SP when representing the image Gf in the three-dimensional image formation space SP, and the display data generation unit 23 that generates the display data Img by quantizing the gradation value Gg indicated by the image data GD using the three-dimensional dither mask DZ having M threshold values Dd corresponding to M pixels Px in the image formation space SP, wherein, in the dither mask DZ, when the image formation space SP is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. Therefore, according to the present embodiment, when the image G having a three-dimensional shape having the plane PL1 and the plane PL2 is formed, it is possible to suppress the occurrence of graininess in the image G.

B. Modification

Each of the above-exemplified embodiments can be variously modified. Specific modification modes are is illustrated below. Two or more modes optionally selected from the following exemplifications can be appropriately merged within a range not inconsistent with each other.
Modification 1

In the above-described embodiment, the case where the quantization process is performed using the dither mask DZ having the same size as the image formation space SP has been illustrated, but the present disclosure is not limited to such an embodiment. For example, the quantization process may be performed using a plurality of dither masks having a size smaller than that of the image formation space SP.

Figure 22:
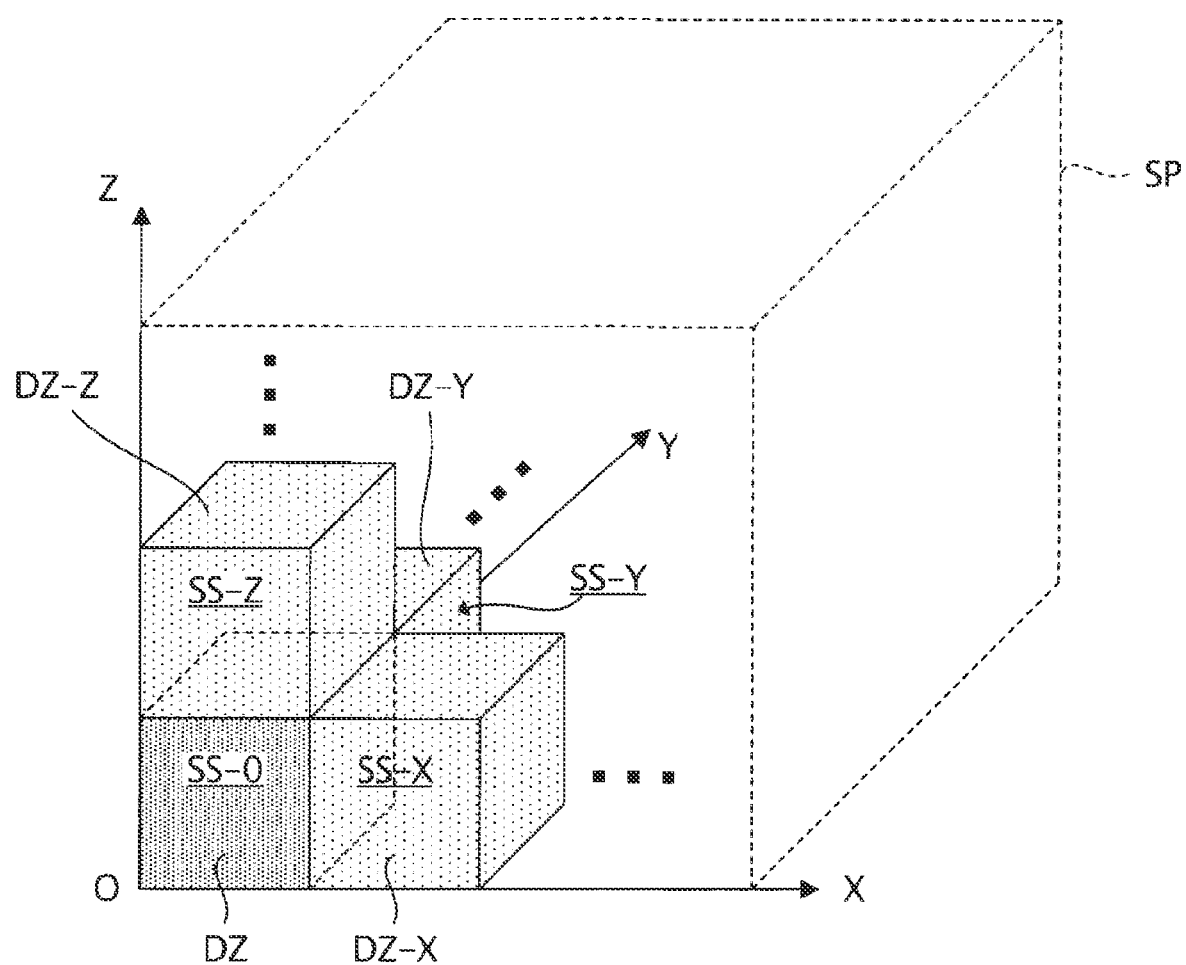
FIG. 22 is an explanatory diagram showing an example of an image formation space according to Modification 1.

FIG. 22 is an explanatory diagram for explaining the image formation space SP in the modification.

As illustrated in FIG. 22, in the modification, the image formation space SP includes a plurality of unit spaces SS. For example, in FIG. 22, the image formation space SP includes a unit space SS-0, a unit space SS-X adjacent to the unit space SS-0 toward the +X direction, a unit space SS-Y adjacent to the unit space SS-0 toward the +Y direction, and a unit space SS-Z adjacent to the unit space SS-0 toward the +Z direction. In the modification, each unit space SS includes a total of Mx*My*Mz=M pixels Px including Mx pixels Px extending in the X axis direction, My pixels Px extending in the Y axis direction, and Mz pixels Px extending in the Z axis direction.

Further, in the modification, a plurality of dither masks corresponding to one-to-one to a plurality of unit spaces SS included in the image formation space SP is provided. Specifically, in the modification, as illustrated in FIG. 22, it is assumed that the dither mask DZ corresponding to the unit space SS-0, a dither mask DZ-X corresponding to the unit space SS-X, a dither mask DZ-Y corresponding to the unit space SS-Y, and a dither mask DZ-Z corresponding to the unit space SS-Z are provided. Each dither mask has M threshold values Dd corresponding one-to-one to M pixels Px included in the unit space SS corresponding to the dither mask and.

In addition, in the modification, it is assumed that the image data GD includes unit image data GS-0 indicating the gradation value to be displayed by each of the M pixels Px included in the unit space SS-0 in order to form the image Gf on the surface SF of the object Obj, unit image data GS-X indicating the gradation value to be displayed by each of the M pixels Px included in the unit space SS-X in order to form the image Gf on the surface SF of the object Obj, unit image data GS-Y indicating the gradation value to be displayed by each of the M pixels Px included in the unit space SS-Y in order to form the image Gf on the surface SF of the object Obj, and unit image data GS-Z indicating the gradation value to be displayed by each of the M pixels Px included in the unit space SS-Z in order to form the image Gf on the surface SF of the object Obj. In addition, in the modification, it is assumed that the display data Img includes unit display data Img-0 indicating the gradation value displayed by each of the M pixels Px included in the unit space SS-0 in order to form an image G on the surface SF of the object Obj, unit display data Img-X indicating the gradation value displayed by each of the M pixels Px included in the unit space SS-X in order to form the image G on the surface SF of the object Obj, unit display data Img-Y indicating the gradation value displayed by each of the M pixels Px included in the unit space SS-Y in order to form the image G on the surface SF of the object Obj, and unit display data Img-Z indicating the gradation value displayed by each of the M pixels Px included in the unit space SS-Z in order to form the image G on the surface SF of the object Obj.

Figure 23:
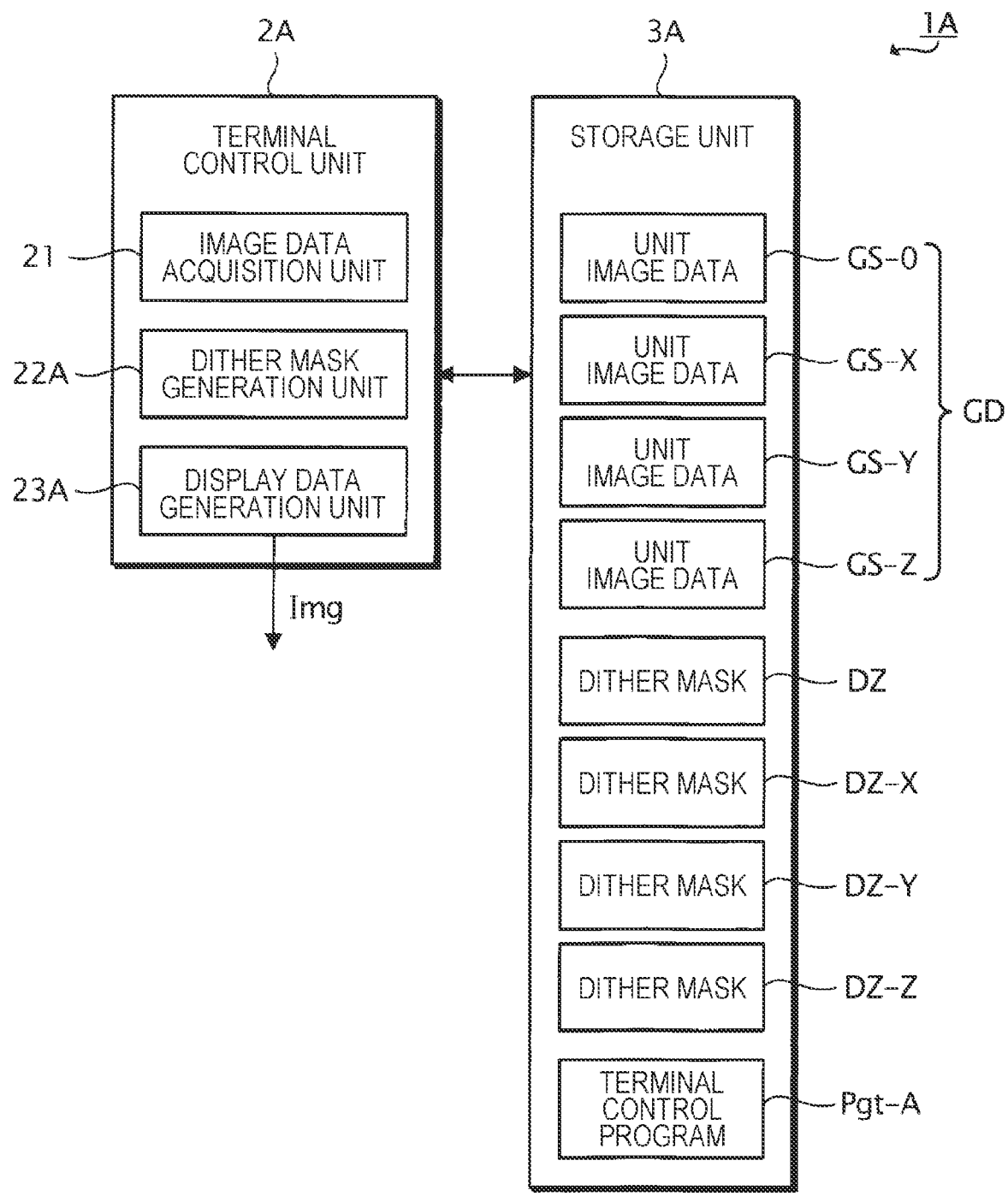
FIG. 23 is a functional block diagram showing an example of the configuration of a terminal device.

FIG. 23 is a functional block diagram showing an example of the configuration of a terminal device 1A provided in the recording system according to the present modification. The recording system according to the modification is configured in the same manner as the recording system Sys according to the embodiment, except that the terminal device 1A is provided instead of the terminal device 1.

As illustrated in FIG. 23, the terminal device 1A is different from the terminal device 1 according to the embodiment in that it includes a terminal control unit 2A instead of the terminal control unit 2 and a storage unit 3A instead of the storage unit 3. The terminal control unit 2A is different from the terminal control unit 2 according to the embodiment in that it includes a dither mask generation unit 22A instead of the dither mask generation unit 22, and a display data generation unit 23A instead of the display data generation unit 23. The storage unit 3A is different from the storage unit 3 according to the embodiment in that it stores the dither mask DZ-X, the dither mask DZ-Y, and the dither mask DZ-Z in addition to the dither mask DZ, and stores a control program Pgt-A instead of the control program Pgt. The terminal control unit 2A can function as the image data acquisition unit 21, the dither mask generation unit 22A, and the display data generation unit 23A when one or a plurality of CPUs provided in the terminal control unit 2A executes the control program Pgt-A stored in the storage unit 3A, and operates according to the control program Pgt-A. The dither mask generation unit 22A generates the dither mask DZ-X, the dither mask DZ-Y, and the dither mask DZ-Z in addition to the dither mask DZ. The display data generation unit 23A performs the quantization process on the unit image data GS-0 using the dither mask DZ to generate the unit display data Img-0, performs the quantization process on the unit image data GS-X using the dither mask DZ-X to generate the unit display data Img-X, performs the quantization process on the unit image data GS-Y using the dither mask DZ-Y to generate the unit display data Img-Y, and performs the quantization process on the unit image data GS-Z using the dither mask DZ-Z to generate the unit display data Img-Z.

Figure 24:
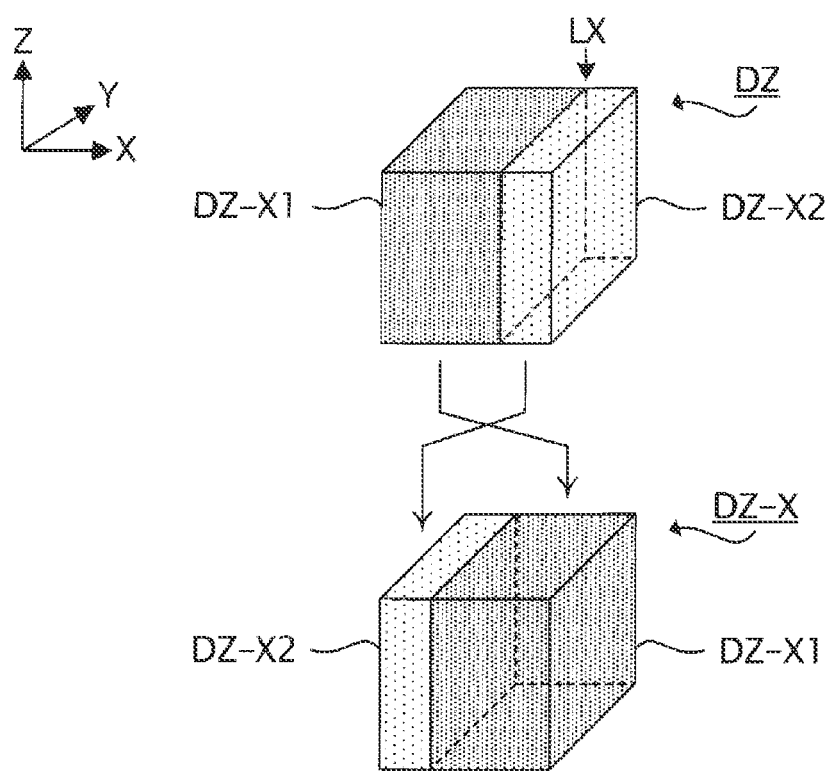
FIG. 24 is an explanatory diagram showing an example of a dither mask.

FIG. 24 is an explanatory diagram for explaining the dither mask DZ-X.

As illustrated in FIG. 24, the dither mask generation unit 22A according to the modification generates the dither mask DZ-X based on the dither mask DZ.

Specifically, the dither mask generation unit 22A first generates the dither mask DZ by the above-mentioned dither mask generation process. Next, the dither mask generation unit 22A divides a unit space SS-0 corresponding to the dither mask DZ into a subspace SB-X1 and a subspace SB-X2. Here, the subspace SB-X1 is a space, of the unit space SS-0, located toward the −X direction relative to a division face LX when the unit space SS-0 is divided by the division face LX parallel to the YZ plane. Further, the subspace SB-X2 is a space, of the unit space SS-0, located toward the −X direction relative to the division face LX. Next, the dither mask generation unit 22A slides a partial dither mask DZ-X1 composed of a plurality of threshold values Dd, of a plurality of threshold values Dd included in the dither mask DZ, corresponding to a plurality of pixels Px included in the subspace SB-X1 in the +X direction, and slides a partial dither mask DZ-X2, of the plurality of threshold values Dd included in the dither mask DZ, composed of a plurality of threshold values Dd corresponding to a plurality of pixels Px included in the subspace SB-X2 in the −X direction. Then, the dither mask generation unit 22A generates the dither mask DZ-X by coupling the partial dither mask DZ-X1 to the partial dither mask DZ-X2 at the +X direction side of the partial dither mask DZ-X2.

Figure 25:
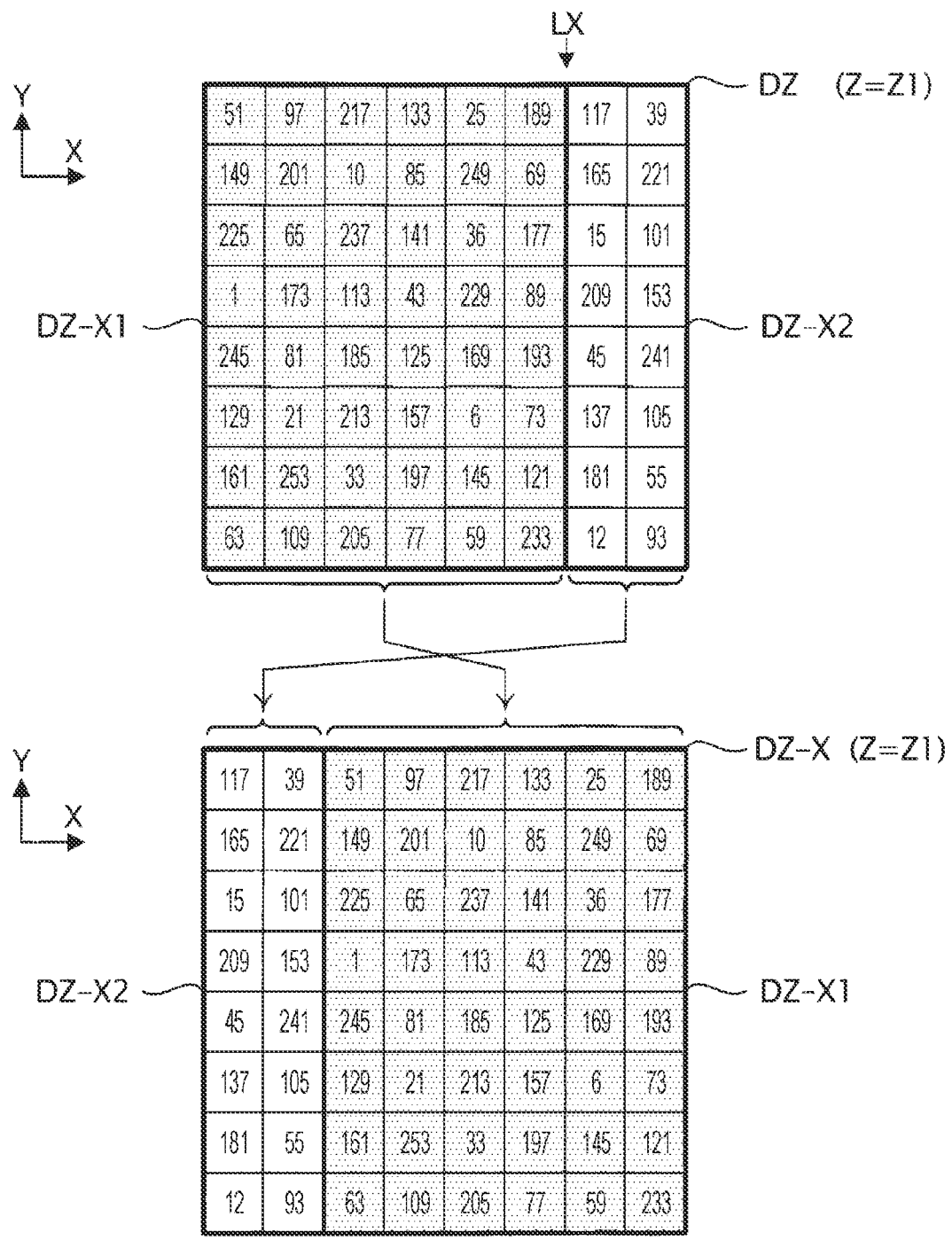
FIG. 25 is an explanatory diagram showing an example of the arrangement of threshold values Dd in the dither mask.

FIG. 25 is explanatory diagram for demonstrating an example of the relationship between a plurality of threshold values Dd corresponding to a plurality of pixels Px located at the plane Z=Z[1] of a plurality of threshold values Dd included in the dither mask DZ, and a plurality of threshold values Dd corresponding to a plurality of pixels Px located at a plane Z=Z[1] of a plurality of threshold values Dd included in the dither mask DZ-X.

In the example shown in FIG. 25, as in the examples shown in FIGS. 10 to 12, it is assumed that Mx=8, My=8, Mz=8, and M=8*8*8=512, and 512 pixels Px exist in the image formation space SP. Further, in the example shown in FIG. 25, as in the examples shown in FIGS. 10 to 12, it is assumed that the gradation value Gg-min is "0", the gradation value Gg-max is "255", the threshold value Dd[1] is "1", and the threshold value Dd[M] is "255".

As illustrated in FIG. 25, the dither mask DZ includes the partial dither mask DZ-X1 and the partial dither mask DZ-X2 disposed on the +X direction side of the partial dither mask DZ-X1. On the other hand, the dither mask DZ-X includes the partial dither mask DZ-X2 and the partial dither mask DZ-X1 disposed on the +X direction side of the partial dither mask DZ-X2. That is, the dither mask DZ-X is a dither mask obtained by exchanging the relative positional relationship between the partial dither mask DZ-X1 and the partial dither mask DZ-X2 that the dither mask DZ has in the X axis direction.

Figure 26:
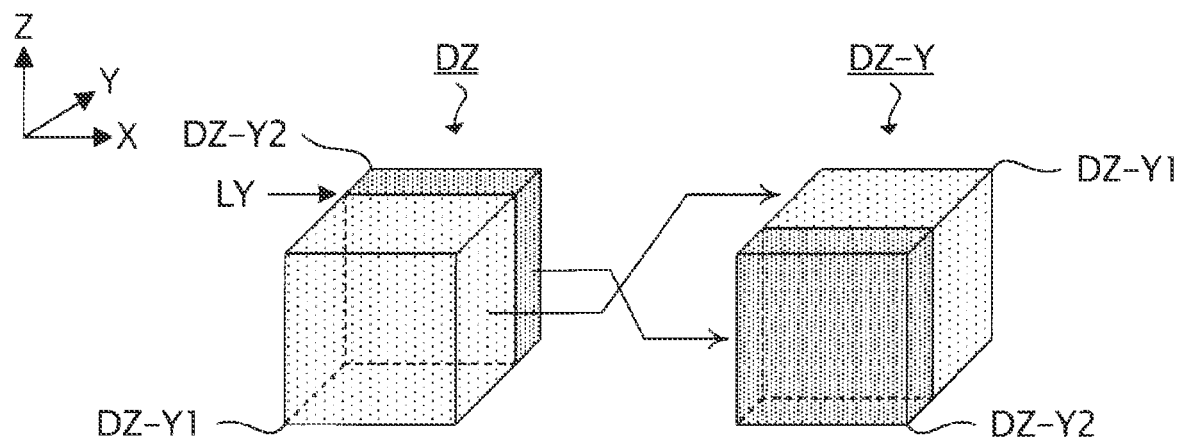
FIG. 26 is an explanatory diagram showing an example of a dither mask.

FIG. 26 is an explanatory diagram for explaining the dither mask DZ-Y.

As illustrated in FIG. 26, the dither mask generation unit 22A according to the modification generates the dither mask DZ-Y based on the dither mask DZ.

Specifically, the dither mask generation unit 22A first generates the dither mask DZ by the above-mentioned dither mask generation process. Next, the dither mask generation unit 22A divides the unit space SS-0 corresponding to the dither mask DZ into a subspace SB-Y1 and a subspace SB-Y2. Here, the subspace SB-Y1 is a space, of the unit space SS-0, located toward the −Y direction relative to a division face LY when the unit space SS-0 is divided by the division face LY parallel to the XZ plane. Further, the subspace SB-Y2 is a space, of the unit space SS-0, located toward the −Y direction relative to the division face LY. Next, the dither mask generation unit 22A slides a partial dither mask DZ-Y1 composed of a plurality of threshold values Dd, of a plurality of threshold values Dd included in the dither mask DZ, corresponding to a plurality of pixels Px included in the subspace SB-Y1 in the +Y direction, and slides a partial dither mask DZ-Y2, of the plurality of threshold values Dd included in the dither mask DZ, composed of a plurality of threshold values Dd corresponding to a plurality of pixels Px included in the subspace SB-Y2 in the −Y direction. Then, the dither mask generation unit 22A generates the dither mask DZ-Y by coupling the partial dither mask DZ-Y1 to the partial dither mask DZ-Y2 at the +Y direction side of the partial dither mask DZ-Y2.

Figure 27:
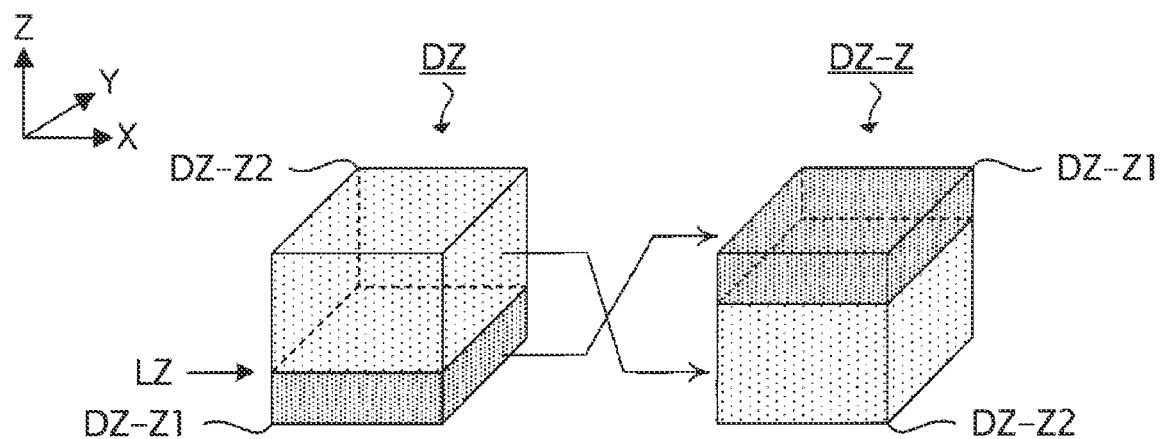
FIG. 27 is an explanatory diagram showing an example of a dither mask.

FIG. 27 is an explanatory diagram for explaining the dither mask DZ-Z.

As illustrated in FIG. 27, the dither mask generation unit 22A according to the modification generates the dither mask DZ-Z based on the dither mask DZ.

Specifically, the dither mask generation unit 22A first generates the dither mask DZ by the above-mentioned dither mask generation process. Next, the dither mask generation unit 22A divides the unit space SS-0 corresponding to the dither mask DZ into a subspace SB-Z1 and a subspace SB-Z2. Here, the subspace SB-Z1 is a space, of the unit space SS-0, located toward the −Z direction relative to a division face LZ when the unit space SS-0 is divided by the division face LZ parallel to the XY plane. Further, the subspace SB-Z2 is a space, of the unit space SS-0, located toward the −Z direction relative to a division face LZ. Next, the dither mask generation unit 22A slides a partial dither mask DZ-Z1 composed of a plurality of threshold values Dd, of a plurality of threshold values Dd included in the dither mask DZ, corresponding to a plurality of pixels Px included in the subspace SB-Z1 in the +Z direction, and slides a partial dither mask DZ-Z2, of the plurality of threshold values Dd included in the dither mask DZ, composed of a plurality of threshold values Dd corresponding to a plurality of pixels Px included in the subspace SB-Z2 in the −Z direction. Then, the dither mask generation unit 22A generates the dither mask DZ-Z by coupling the partial dither mask DZ-Z1 to the partial dither mask DZ-Z2 at the +Z direction side of the partial dither mask DZ-Z2.

As described above, according to the modification, the same dither mask DZ is not uniformly applied to a plurality of unit spaces SS, but a plurality types of dither masks is applied. Therefore, according to the modification, when the image G is formed across a plurality of unit spaces SS, it is possible to prevent the same pattern from being repeated in the cycle of the unit space SS.

Further, according to the modification, the dither mask generation unit 22A generates the dither mask DZ-X, the dither mask DZ-Y, and the dither mask DZ-Z based on the dither mask DZ without performing the dither mask generation process. Therefore, according to the modification, it is possible to reduce the processing load related to the generation of the dither mask DZ-X, the dither mask DZ-Y, and the dither mask DZ-Z, compared with the embodiment in which the dither mask DZ-X, the dither mask DZ-Y, and the dither mask DZ-Z are generated by the dither mask generation process.

As explained in the above, the terminal device 1A according to the modification includes the image data acquisition unit 21 that acquires the unit image data GS-0 indicating the gradation value Gg of the image Gf to be displayed by each of the M pixels Px in the unit space SS-0 when representing the image Gf in the three-dimensional unit space SS-0, and that acquires the unit image data GS-X indicating the gradation value Gg of the image Gf to be displayed by each of the M pixels Px in the unit space SS-X when representing the image Gf in the three-dimensional unit space SS-X adjacent to the unit space SS-0, and the display data generation unit 23A that generates the unit display data Img-0 by quantizing the gradation value indicated by the unit image data GS-0 using the three-dimensional dither mask DZ having M threshold values Dd corresponding to M pixels Px in the unit space SS-0, and that generates the unit display data Img-X by quantizing the gradation value indicated by the unit image data GS-X using the three-dimensional dither mask DZ-X having M threshold values Dd corresponding to M pixels Px in the unit space SS-X, wherein, in the dither mask DZ, when the unit space SS-0 is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the unit space SS-0 is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, wherein the unit space SS-0 is divided into the subspace SB-X1 and the subspace SB-X2, and wherein the dither mask DZ-X has a plurality of threshold values Dd disposed so as to exchange a relative positional relationship between a plurality of threshold values Dd existing in the subspace SB-X1 and a plurality of threshold values Dd existing in the subspace SB-X2 of the M threshold values Dd, corresponding to the M pixels Px in the unit space SS-0, that the dither mask DZ has. Therefore, according to the modification, when the image G existing across the unit space SS-0 and the unit space SS-X and having a three-dimensional shape having a plane PL1 and a plane PL2 is formed, it is possible to suppress the occurrence of graininess in the image G. That is, according to the present embodiment, when the image G existing across the unit space SS-0 and the unit space SS-X and having a three-dimensional shape having a plane PL1 and a plane PL2 is formed, it is possible to suppress deterioration of the image quality of the image G due to the occurrence of graininess in the image G. In addition, in the embodiment, the terminal device 1A is an example of the "image processing device", the image data acquisition unit 21 is an example of the "acquisition unit", the display data generation unit 23A is an example of the "generation unit", the unit space SS-0 is an example of the "first space", the unit space SS-X is an example of the "second space", the unit image data GS-0 is an example of the "first image data", the unit image data GS-X is an example of the "second image data", and the dither mask DZ is an example of the "first dither mask". The dither mask DZ-X is an example of the "second dither mask", the unit display data Img-0 is an example of the "first display data", the unit display data Img-X is an example of the "second display data", the plane PL1 is an example of the "first plane", the plane PL2 is an example of the "second plane", the intermediate frequency fmid is an example of the "predetermined frequency", the subspace SB-X1 is an example of the "first subspace", and the subspace SB-X2 is an example of the "second subspace".

Further, in the terminal device 1A according to the modification, the configuration may be characterized in that the plurality of pixels Px in the image formation space SP including the unit space SS-0 and the unit space SS-X includes two or more pixels Px disposed so as to extend in the +X direction, two or more pixels Px disposed so as to extend in the +Y direction orthogonal to the +X direction, and two or more pixels Px disposed so as to extend in the +Z direction orthogonal to the +X direction and the +Y direction, and the unit space SS-X is located in the +X direction when viewed from the unit space SS-0.

Further, in the terminal device 1A according to the modification, the configuration may be characterized in that the image data acquisition unit 21 acquires the unit image data GS-Y indicating the gradation value Gg of the image Gf to be displayed by each of the M pixels Px in the unit space SS-Y when representing the image Gf in the three-dimensional unit space SS-Y adjacent to the unit space SS-0, wherein the display data generation unit 23A generates the unit display data Img-Y by quantizing the gradation value indicated by the unit image data GS-Y using the three-dimensional dither mask DZ-Y having M threshold values Dd corresponding to M pixels Px in the unit space SS-Y, wherein the unit space SS-0 is divided into the subspace SB-Y1 and the subspace SB-Y2, wherein the dither mask DZ-Y has a plurality of threshold values Dd disposed so as to exchange a relative positional relationship between a plurality of threshold values Dd existing in the subspace SB-Y1 and a plurality of threshold values Dd existing in the subspace SB-Y2 of the M threshold values Dd, corresponding to the M pixels Px in the unit space SS-0, that the dither mask DZ has, and wherein the direction in which the unit space SS-X is located when viewed from the unit space SS-0 is different from the direction in which the unit space SS-Y is located when viewed from the unit space SS-0, and the direction in which the subspace SB-X2 is located when viewed from the subspace SB-X1 is different from the direction in which the subspace SB-Y2 is located when viewed from the subspace SB-Y1. Therefore, according to the modification, when the image G existing across the unit space SS-0, the unit space SS-X, and the unit space SS-Y, and having a three-dimensional shape having a plane PL1 and a plane PL2 is formed, it is possible to suppress the occurrence of graininess in the image G. In addition, in the embodiment, the unit space SS-Y is an example of the "third space", the unit image data GS-Y is an example of the "third image data", the dither mask DZ-Y is an example of the "third dither mask", the unit display data Img-Y is an example of the "third display data", the subspace SB-Y1 is an example of the "third subspace", and the subspace SB-Y2 is an example of the "fourth subspace".

Modification 2

In the above-described embodiment and Modification 1, the image Gf indicated by the image data GD and the image G indicated by the display data Img may include a plurality of colors. In this case, a plurality of dither masks may be provided so as to correspond one-to-one to the plurality of colors of the image Gf indicated by the image data GD and the image G indicated by the display data Img.

Figure 28:
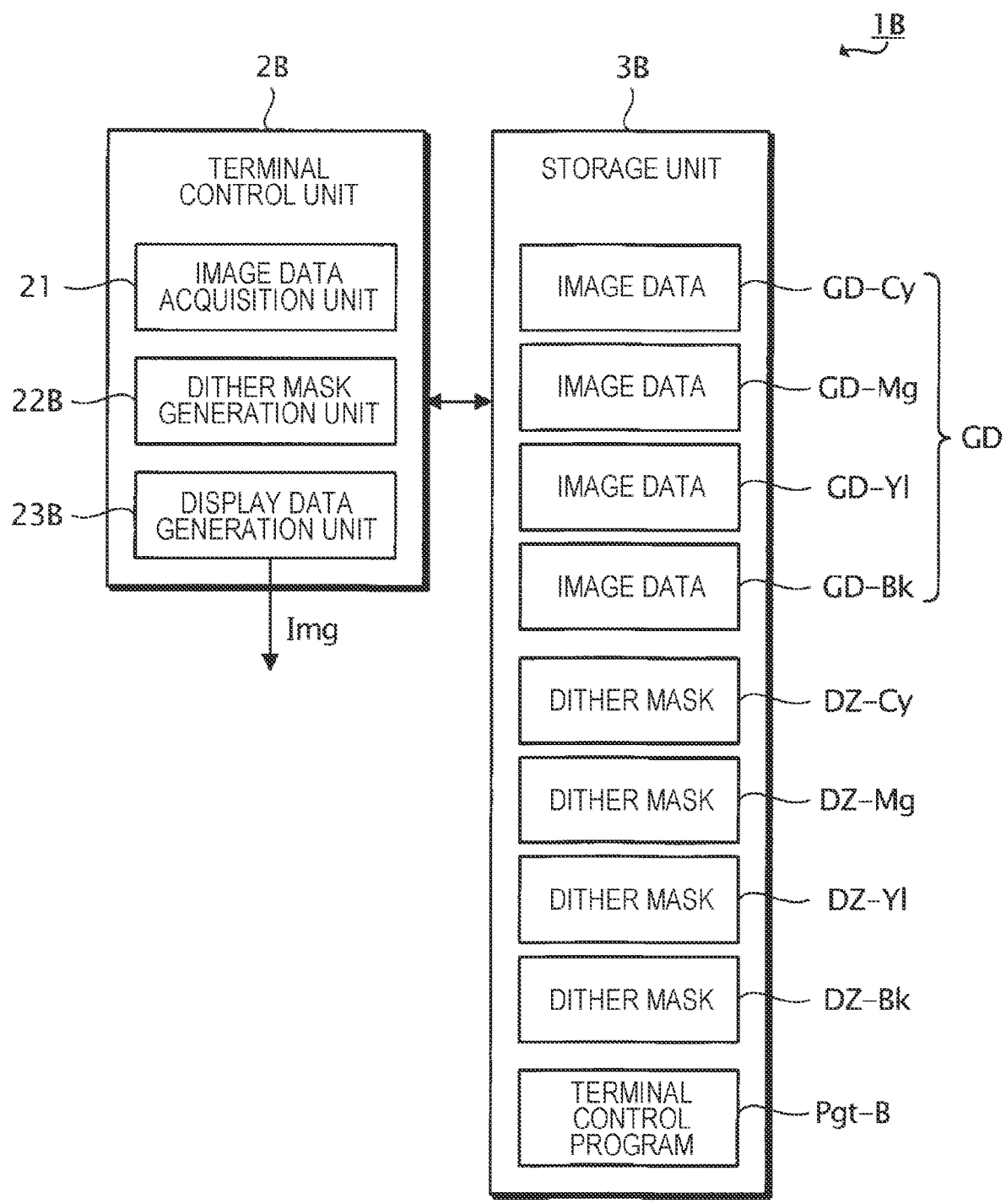
FIG. 28 is a functional block diagram showing an example of the configuration of a terminal device according to Modification 2.

FIG. 28 is a functional block diagram showing an example of the configuration of a terminal device 1B provided in the recording system according to the modification. The recording system according to the modification is configured in the same manner as the recording system Sys according to the embodiment, except that the terminal device 1B is provided instead of the terminal device 1.

As illustrated in FIG. 28, the terminal device 1B is different from the terminal device 1 according to the embodiment in that it includes a terminal control unit 2B instead of the terminal control unit 2 and a storage unit 3B instead of the storage unit 3. The terminal control unit 2B is different from the terminal control unit 2 according to the embodiment in that it includes a dither mask generation unit 22B instead of the dither mask generation unit 22, and a display data generation unit 23B instead of the display data generation unit 23.

In the modification, it is assumed that the image Gf indicated by the image data GD and the image G indicated by the display data Img are represented by four colors of cyan, magenta, yellow, and black. In the modification, it is assumed that the image data GD includes image data GD-Cy indicating a cyan gradation value to be displayed by each of the M pixels Px included in the image formation space SP in order to form the image Gf on the surface SF of the object Obj, image data GD-Mg indicating a magenta gradation value to be displayed by each of the M pixels Px included in the image formation space SP in order to form the image Gf on the surface SF of the object Obj, image data GD-Y1 indicating a yellow gradation value to be displayed by each of the M pixels Px included in the image formation space SP in order to form the image Gf on the surface SF of the object Obj, and image data GD-Bk indicating a black gradation value to be displayed by each of the M pixels Px included in the image formation space SP in order to form the image Gf on the surface SF of the object Obj. In addition, in the modification, it is assumed that the display data Img includes display data Img-Cy indicating a cyan gradation value displayed by each of the M pixels Px included in the image formation space SP in order for to form an image G on the surface SF of the object Obj, display data Img-Mg indicating a magenta gradation value displayed by each of the M pixels Px included in the image formation space SP in order to form the image G on the surface SF of the object Obj, display data Img-Y1 indicating a yellow gradation value displayed by each of the M pixels Px included in the image formation space SP in order to form the image G on the surface SF of the object Obj, and display data Img-Bk indicating a black gradation value displayed by each of the M pixels Px included in the image formation space SP in order to form the image G on the surface SF of the object Obj.

The storage unit 3B stores the image data GD including the image data GD-Cy, the image data GD-Mg, the image data GD-Y1, and the image data GD-Bk, and a dither mask DZ-Cy, a dither mask DZ-Mg, a dither mask DZ-Y1, and a dither mask DZ-Bk, and a control program Pgt-B. Here, the dither mask DZ-Cy is a dither mask used when performing a quantization process on the image data GD-Cy. The dither mask DZ-Cy has, for example, M threshold values Dd corresponding one-to-one to M pixels Px in the image formation space SP. The dither mask DZ-Cy may have a predetermined spatial frequency characteristic at least in the plane PL1 and the plane PL2, and further may have a predetermined spatial frequency characteristic in part or all of the plane PL3 to the plane PL6. Further, the dither mask DZ-Mg is a dither mask used when performing a quantization process on the image data GD-Mg. The dither mask DZ-Mg has, for example, M threshold values Dd corresponding one-to-one to M pixels Px in the image formation space SP. The dither mask DZ-Mg may have a predetermined spatial frequency characteristic at least in the plane PL1 and the plane PL2, and further may have a predetermined spatial frequency characteristic in part or all of the plane PL3 to the plane PL6. Further, the dither mask DZ-Y1 is a dither mask used when performing a quantization process on the image data GD-Y1. The dither mask DZ-Y1 has, for example, M threshold values Dd corresponding one-to-one to M pixels Px in the image formation space SP. The dither mask DZ-Y1 may have a predetermined spatial frequency characteristic at least in the plane PL1 and the plane PL2, and further may have a predetermined spatial frequency characteristic in part or all of the plane PL3 to the plane PL6. Further, the dither mask DZ-Bk is a dither mask used when performing a quantization process on the image data GD-Bk. The dither mask DZ-Bk has, for example, M threshold values Dd corresponding one-to-one to M pixels Px in the image formation space SP. The dither mask DZ-Bk may have a predetermined spatial frequency characteristic at least in the plane PL1 and the plane PL2, and further may have a predetermined spatial frequency characteristic in part or all of the plane PL3 to the plane PL6. The dither mask DZ-Cy, the dither mask DZ-Mg, the dither mask DZ-Y1, and the dither mask DZ-Bk may have an arrangement mode with the same threshold value Dd to each other, or may have an arrangement mode with different threshold value Dd to each other.

The terminal control unit 2B can function as the image data acquisition unit 21, the dither mask generation unit 22B, and the display data generation unit 23B when one or a plurality of CPUs provided in the terminal control unit 2B executes the control program Pgt-B stored in the storage unit 3B, and operates according to the control program Pgt-B. The dither mask generation unit 22B generates the dither mask DZ-Cy, the dither mask DZ-Mg, the dither mask DZ-Y1, and the dither mask DZ-Bk by the dither mask generation process described above. The display data generation unit 23B generates the display data Img-Cy by performing the quantization process on the image data GD-Cy using the dither mask DZ-Cy, generates the display data Img-Mg by performing the quantization process on the image data GD-Mg using the dither mask DZ-Mg, generates the display data Img-Y1 by performing the quantization process on the image data GD-Y1 using the dither mask DZ-Y1, and generates the display data Img-Bk by performing the quantization process on the image data GD-Bk using the dither mask DZ-Bk.

As mentioned above, according to the modification, since a plurality of dither masks is provided so as to correspond one-to-one to a plurality of colors of the image Gf indicated by the image data GD and the image G indicated by the display data Img, it is possible to suppress the occurrence of graininess in the image G when the image Gf indicated by the image data GD and the image G indicated by the display data Img are color images.

As explained in the above, the terminal device 1B according to the modification includes the image data acquisition unit 21 that acquires the image data GD-Cy indicating the gradation value of the cyan image to be displayed by each of the M pixels Px in the image formation space SP when representing the cyan image in the three-dimensional image formation space SP, and that acquires the image data GD-Mg indicating the gradation value of the magenta image to be displayed by each of the M pixels Px in the image formation space SP when representing the magenta image in the image formation space SP, and the display data generation unit 23B that generates the display data Img-Cy, of the display data Img, corresponding to cyan by quantizing the gradation value indicated by the image data GD-Cy using the three-dimensional dither mask DZ-Cy having M threshold values Dd corresponding to M pixels Px in the image formation space SP, and that generates the display data Img-Mg, of display data Img, corresponding to magenta by quantizing the gradation value indicated by the image data GD-Mg using the three-dimensional dither mask DZ-Mg having M threshold values Dd corresponding to M pixels Px in the image formation space SP, wherein, in the dither mask DZ-Cy, when the image formation space SP is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, wherein, in the dither mask DZ-Mg, when the image formation space SP is cut by the plane PL1, a plurality of threshold values Dd in the plane PL1 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain, and when the image formation space SP is cut by the plane PL2 extending in a direction different from that of the plane PL1, a plurality of threshold values Dd in the plane PL2 has a predetermined spatial frequency characteristic in which an amount of high frequency components in a range of spatial frequencies higher than the intermediate frequency fmid is larger than an amount of low frequency components in a range of spatial frequencies lower than the intermediate frequency fmid in a spatial frequency domain. That is, in the image processing device according to the modification, the first image data includes the first color image data indicating the gradation value of the first color image to be displayed by each of the plurality of pixels in the first space when representing the first color image in the first space, and the second color image data indicating the gradation value of the second color image to be displayed by each of the plurality of pixels in the first space when representing the second color image in the first space, wherein the generation unit generates the first color display data, of the first display data, corresponding to the first color by quantizing the gradation value indicated by the first color image data using the three-dimensional first-color dither mask having a plurality of threshold values corresponding to a plurality of pixels in the first space, and generates the second color display data, of the first display data, corresponding to the second color by quantizing the gradation value indicated by the second color image data using the three-dimensional second-color dither mask hav-ing a plurality of threshold values corresponding to a plurality of pixels in the first space, wherein the first color dither mask and the second color dither mask are different from each other, wherein, in the first color dither mask, when the first space is cut by the first plane, the plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by the second plane, the plurality of threshold values in the second plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, wherein, the second color dither mask, when the first space is cut by the first plane, the plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by the second plane, the plurality of threshold values in the second plane has a frequency characteristic in which an amount of high frequency components in a range of spatial frequencies higher than a predetermined frequency is larger than an amount of low frequency components in a range of spatial frequencies lower than the predetermined frequency in a spatial frequency domain That is, in the terminal device 1 according to the modification, the display data generation unit 23B generates the display data Img-Cy by quantizing the gradation value indicated by the image data GD-Cy using a dither mask DZ-Cy having a predetermined spatial frequency characteristic in the plane PL1 and having the predetermined spatial frequency characteristic in the plane PL2 extending in a direction different from that of the plane PL1, and generates the display data Img-Mg by quantizing the gradation value indicated by the image data GD-Mg using a dither mask DZ-Mg having the predetermined spatial frequency characteristic in the plane PL1 and having the predetermined spatial frequency characteristic in the plane PL2 extending in a direction different from that of the plane PL1. Therefore, according to the modification, when the image G having a three-dimensional shape having the plane PL1 and the plane PL2, and composed of a plurality of colors is formed, it is possible to suppress the occurrence of graininess in the image G. That is, according to the modification, when the image G having a three-dimensional shape having the plane PL1 and the plane PL2, and composed of a plurality of colors is formed, it is possible to suppress deterioration of the image quality of the image G due to the occurrence of graininess in the image G. In the modification, the terminal device 1B is an example of the "image processing device", the image data acquisition unit 21 is an example of the "acquisition unit", the display data generation unit 23B is an example of the "generation unit", the image formation space SP is an example of the "first space", cyan is an example of the "first color", magenta is an example of the "second color", the cyan image is an example of the "first color image", the magenta image is an example of the "second color image", the image data GD-Cy is an example of the "first color image data", the image data GD-Mg is an example of the "second color image data", the dither mask DZ-Cy is an example of the "first color dither mask", the dither mask DZ-Mg is an example of the "second color dither mask", the display data Img-Cy is an example of the "first color display data", the display data Img-Mg is an example of the "second color display data", the intermediate frequency fmid is an example of the "predetermined frequency", the plane PL1 is an example of the "first plane", and the plane PL2 is an example of the "second plane".

Further, in the terminal device 1B according to the modification, the configuration may be characterized in that the image data acquisition unit 21 acquires the image data GD-Cy, of the image data GDs, corresponding to cyan and the image data GD-Mg, of the image data GD, corresponding to magenta, and the display data generation unit 23B generates the display data Img-Cy, of the display data Img, corresponding to cyan by performing the quantization process on the image data GD-Cy using one dither mask DZ, and generates the display data Img-Mg, of the display data Img, corresponding to magenta by performing the quantization process on the image data GD-Mg using another dither mask DZ, and the one dither mask DZ and the another dither masks DZ are different from each other.

Modification 3

In the above-described embodiment and Modifications 1 and 2, the value Mx, the value My, and the value Mz may be values satisfying the following Equation (10).

$$Mx=My=Mz=2^\alpha \qquad (10)$$

where $\alpha$ is a natural number of 2 or more.

Modification 4

In the above-described embodiments and Modifications 1 to 3, the terminal control unit 2, the terminal control unit 2A, or the terminal control unit 2B, and the storage unit 3, the storage unit 3A, or the storage unit 3B may be mounted on the recording apparatus 5. Further, in the above-described embodiments and Modifications 1 to 3, the terminal device 1, the terminal device 1A, or the terminal device 1B may include the recording control unit 6, the head unit 7, the ink supply unit 8, and the robot hand 9.

Modification 5

In the above-described embodiment and Modifications 1 to 4, the robot hand 9 changes the position and the posture of the head unit 7 in the image formation space SP, but the present disclosure is not limited to such an embodiment. The robot hand 9 may be configured to change the position and posture of the object Obj in the image formation space SP. In this case, the position and the posture of the head unit 7 may be fixed in the image formation space SP.

Modification 6

In the above-described embodiment and Modifications 1 to 5, the terminal control unit 2, the terminal control unit 2A, and the terminal control unit 2B have the dither mask generation unit 22, the dither mask generation unit 22A, or the dither mask generation unit 22B, but the present disclosure is not limited to such an embodiment.

Figure 29:
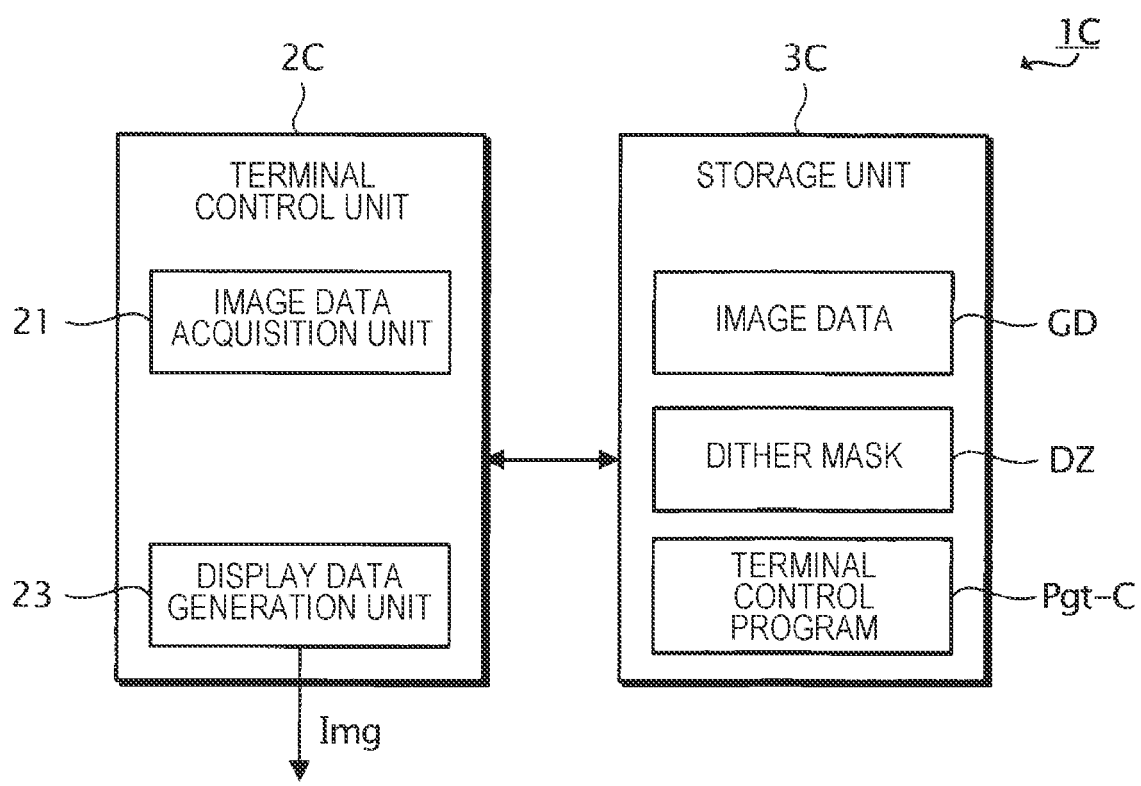
FIG. 29 is a functional block diagram showing an example of the configuration of a terminal device according to Modification 6.

FIG. 29 is a functional block diagram showing an example of the configuration of a terminal device 1C included in the recording system according to the modification. The recording system according to the modification is configured in the same manner as the recording system Sys according to the embodiment, except that the terminal device 1C is provided instead of the terminal device 1.

As illustrated in FIG. 29, the terminal device 1C is different from the terminal device 1 according to the embodiment in that it includes a terminal control unit 2C instead of the terminal control unit 2 and a storage unit 3C instead of the storage unit 3. The terminal control unit 2C is configured in the same manner as the terminal control unit 2 according to the embodiment, except that the dither mask generation unit 22 is not provided. The storage unit 3C is configured in the same manner as the storage unit 3 according to the embodiment, except that a control program Pgt-C is stored instead of the control program Pgt. The terminal control unit 2C can function as the image data acquisition unit 21, and the display data generation unit 23 when one or a plurality of CPUs provided in the terminal control unit 2C executes the control program Pgt-C stored in the storage unit 3C, and operates according to the control program Pgt-C. In the modification, the image data acquisition unit 21 may acquire the dither mask DZ from an external device existing outside the terminal device 1C and store it in the storage unit 3.

Modification 7

In the above-described embodiment and Modifications 1 to 5, the so-called halftone process is performed as a quantization process in which binary display data Img is generated from multi-valued image data GD, but the present disclosure is limited to such an embodiment. In Modification 7, when the integers satisfying $2 \leq \theta < \Phi$ are $\theta$ and $\Phi$, the display data Img of the $\Phi$ value is generated from the image data GD of the $\theta$ value. In the following, as an example, a case where $\Phi=5$, that is, a case where five-value display data Img is generated will be described in detail. For the image data GD, $\theta=256$.

FIG. 30 is a flowchart showing an example of the operation of the recording system Sys when the recording system Sys executes the quantization process in Modification 7.

As illustrated in FIG. 30, when the quantization process is started, the display data generation unit 23 selects a pixel Px(mx, my, mz) from the M pixels Px in the image formation space SP (S30).

Next, the display data generation unit 23 divides a gradation value Gg(mx, my, mz), of the plurality of gradation values Gg indicated by the image data GD, corresponding to the pixel Px(mx, my, mz) selected in step S30 by a predetermined value to acquire the quotient GgApixel Px(mx, my, mz) and the remainder GgB(mx, my, mz) (S31). Here, the predetermined value is a quotient obtained by dividing the gradation number $\theta$ of the image data GD by the number obtained by subtracting one from the gradation number $\Phi$ of the display data Img. In Modification 7, as described above, $\theta=256$ and $\Phi=5$. Therefore, the predetermined value is $\theta/(\Phi-1)=64$. For example, when the gradation value Gg(mx, my, mz)=128, the quotient GgA(mx, my, mz)=2 and the remainder GgB(mx, my, mz)=0. Further, for example, when the gradation value Gg(mx, my, mz)=32, the quotient GgA (mx, my, mz)=0 and the remainder GgB(mx, my, mz)=32. Further, for example, when the gradation value Gg(mx, my, mz)=96, the quotient GgA(mx, my, mz)=1 and the remainder GgB(mx, my, mz)=32.

Next, the display data generation unit 23 determines whether the remainder GgB(mx, my, mz) corresponding to the pixel Px(mx, my, mz) selected in step S30 is equal to or larger than the threshold value Dd(mx, my, mz), of a plurality of threshold values Dd(mx, my, mz) indicated by the dither mask DZ, corresponding to the pixel Px(mx, my, mz) selected in step S30 (S32).

Here, the dither mask DZ to be used is defined in the same manner as in the above-described embodiment. However, the threshold value Dd[M] satisfies the following Equation (11) instead of Equation (2) shown in the embodiment.

$$Dd[M]=GgB\text{-max} \qquad (11)$$

where GgB-max in Equation (11) is the maximum value of the above-mentioned remainder GgB(mx, my, mz). That is, it is a value obtained by subtracting one from a predetermined value. In Modification 7, as described above, GgB-max=predetermined value-1=63.

As illustrated in FIG. 30, when the result of the determination in step S32 is affirmative, the display data generation unit 23 sets the gradation indicated by the pixel Px(mx, my, mz) in the display data Img to a value obtained by adding one to the quotient GgA(mx, my, mz) (S33). On the other hand, when the result of the determination in step S32 is negative, the display data generation unit 23 sets the gradation indicated by the pixel Px(mx, my, mz) in the display data Img to the quotient GgA(mx, my, mz) (S34). For example, in the pixel Px(mx, my, mz) selected in step S30, when the gradation value Gg(mx, my, mz)=128, the remainder GgB(mx, my, mz)=0 as described above. On the other hand, from Equation (1), since the threshold value Ddpixel Px(mx, my, mz)≥1 for any pixel Px(mx, my, mz), GgBpixel Px(mx, my, mz)<Dd(mx, my, mz). Therefore, in step S34, the gradation of the display data Img in the pixel Px(mx, my, mz) is set to the quotient GgA(mx, my, mz)=2. Further, for example, in the pixel Px(mx, my, mz) selected in step S30, when the gradation value Gg(mx, my, mz)=32, the remainder GgB(mx, my, mz)=32 as described above. Therefore, when the threshold value Dd(mx, my, mz) of the pixel Px(mx, my, mz) selected in step S30 of the dither mask DZ is larger than 32, the gradation of the display data Img in the pixel Px(mx, my, mz) is set to the quotient GgA(mx, my, mz)=0 in step S34. On the other hand, when the threshold value Dd(mx, my, mz) of the pixel Px(mx, my, mz) selected in step S30 of the dither mask DZ is 32 or less, the gradation of the display data Img in the pixel Px(mx, my, mz) is set to a value obtained by adding one to the quotient GgA(mx, my, mz), that is, "1" in step S33. Further, for example, in the pixel Px(mx, my, mz) selected in step S30, when the gradation value Gg(mx, my, mz)=96, the remainder GgB(mx, my, mz)=32 as described above. Therefore, when the threshold value Dd(mx, my, mz) of the pixel Px(mx, my, mz) selected in step S30 of the dither mask DZ is larger than 32, the gradation of the display data Img in the pixel Px(mx, my, mz) is set to the quotient GgA(mx, my, mz)=1 in step S34. On the other hand, when the threshold value Dd(mx, my, mz) of the pixel Px(mx, my, mz) selected in step S30 of the dither mask DZ is 32 or less, the gradation of the display data Img in the pixel Px(mx, my, mz) is set to a value obtained by adding "1" to the quotient GgA(mx, my, mz), that is, "2" in step S33. As a result, the gradation of the display data Img in the pixels Px(mx, my, mz) is set to any of "0" to "4".

Next, the display data generation unit 23 determines whether the gradation of the display data is set for all of the M pixels Px in the image formation space SP in the display data Img (S35). Then, when the result of the determination in step S35 is negative, the display data generation unit 23 advances the process to step S30. On the other hand, the display data generation unit 23 ends the quantization process when the result of the determination in step S35 is affirmative.

The five-value display data Img generated as described above can be used by various methods. For example, the drive waveform to be applied may be different depending on the five-value display data Img. For example, setting may be performed so as not to eject the ink when the display data Img="0", to eject approximately 1 pl of ink when the display data Img="1", to eject approximately 2 pl of ink when the display data Img="2", to eject approximately 3 pl of ink when the display data Img="3", and to eject approximately 4 pl of ink when the display data Img="4". Further, the number of times the ink is ejected for one pixel may be different depending on the five-value display data Img. For example, setting may be performed so as not to eject the ink when the display data Img="0", to eject the ink once when the display data Img="1", to eject the ink twice when the display data Img="2", to eject the ink three times when the display data Img="3" and to eject the ink four times when the display data Img="4".

What is claimed is:

1. An image processing device comprising:
    an acquisition unit acquiring, when representing an image in a three-dimensional first space, first image data indicating a gradation value of an image to be displayed by each of a plurality of pixels in the first space; and
    a generation unit generating first display data by quantizing a gradation value indicated by the first image data using a three-dimensional first dither mask having a plurality of threshold values corresponding to a plurality of pixels in the first space, wherein
    in the three-dimensional first dither mask,
    when the first space is cut by a first plane,
    a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and
    when the first space is cut by a second plane that is not parallel to the first plane,
    a plurality of threshold values in the second plane has a frequency characteristic in which an amount of high frequency components in a range of spatial frequencies higher than the predetermined frequency is larger than an amount of low frequency components in a range of spatial frequencies lower than the predetermined frequency in a spatial frequency domain.

2. The image processing device according to claim 1, wherein
    in the three-dimensional first dither mask,
    when the first space is cut by a third plane parallel to the first plane,
    a plurality of threshold values in the third plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and
    when the first space is cut by a fourth plane parallel to the second plane,
    a plurality of threshold values in the fourth plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

3. The image processing device according to claim 1, wherein
    in the three-dimensional first dither mask,
    when the first space is cut by any plane parallel to the first plane,
    a plurality of threshold values in the any plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by any plane parallel to the second plane, a plurality of threshold values in the any plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

4. The image processing device according to claim 1, wherein in the three-dimensional first dither mask, when the first space is cut by a fifth plane extending in a direction different from a direction of the first plane and a direction of the second plane, a plurality of threshold values in the fifth plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

5. The image processing device according to claim 4, wherein in the three-dimensional first dither mask, when the first space is cut by a sixth plane parallel to the fifth plane, a plurality of threshold values in the sixth plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

6. The image processing device according to claim 4, wherein in the three-dimensional first dither mask, when the first space is cut by any plane parallel to the fifth plane, a plurality of threshold values in the any plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

7. The image processing device according to claim 1, wherein a plurality of pixels in the first space includes two or more pixels disposed so as to extend in a first direction, two or more pixels disposed so as to extend in a second direction orthogonal to the first direction, and two or more pixels disposed so as to extend in a third direction orthogonal to the first direction and the second direction, and wherein the first plane is a plane having a normal vector extending in a direction perpendicular to the first direction, and the second plane is a plane having a normal vector extending in a direction perpendicular to the second direction.

8. The image processing device according to claim 7, wherein the first plane is a plane having a normal vector extending in a direction perpendicular to the second direction, and the second plane is a plane having a normal vector extending in a direction perpendicular to the third direction.

9. The image processing device according to claim 1, wherein a plurality of threshold values in the first plane has a frequency characteristic different from a white noise characteristic in a spatial frequency domain, and a plurality of threshold values in the second plane has a frequency characteristic different from a white noise characteristic in a spatial frequency domain.

10. The image processing device according to claim 1, wherein a plurality of threshold values in the first plane has a blue noise characteristic in a spatial frequency domain, and a plurality of threshold values in the second plane has a blue noise characteristic in a spatial frequency domain.

11. The image processing device according to claim 1, wherein the acquisition unit acquires, when representing an image in a three-dimensional second space adjacent to the first space, second image data indicating a gradation value of an image to be displayed by each of a plurality of pixels in the second space, wherein the generation unit generates second display data by quantizing a gradation value indicated by the second image data using a three-dimensional second dither mask having a plurality of threshold values corresponding to a plurality of pixels in the second space, wherein the first space is divided into a first subspace and a second subspace, and wherein the three-dimensional second dither mask has a plurality of threshold values disposed so as to exchange a relative positional relationship between a plurality of threshold values existing in the first subspace and a plurality of threshold values existing in the second subspace of a plurality of threshold values, corresponding to a plurality of pixels in the first space, that the three-dimensional first dither mask has.

12. The image processing device according to claim 11, wherein a plurality of pixels in a three-dimensional space including the first space and the second space includes two or more pixels disposed so as to extend in a first direction, two or more pixels disposed so as to extend in a second direction orthogonal to the first direction, and two or more pixels disposed so as to extend in a third direction orthogonal to the first direction and the second direction, and wherein the second subspace is located in the first direction, the second direction, or the third direction when viewed from the first subspace.

13. The image processing device according to claim 11, wherein the acquisition unit acquires, when representing an image in a three-dimensional third space adjacent to the first space, third image data indicating a gradation value of an image to be displayed by each of a plurality of pixels in the third space, wherein the generation unit generates third display data by quantizing a gradation value indicated by the third image data using a three-dimensional third dither mask having a plurality of threshold values corresponding to a plurality of pixels in the third space, wherein the first space is divided into a third subspace and a fourth subspace, wherein the three-dimensional third dither mask has a plurality of threshold values disposed so as to exchange a relative positional relationship between a plurality of threshold values existing in the third subspace and a plurality of threshold values existing in the fourth subspace of a plurality of threshold values, corresponding to a plurality of pixels in the first space, that the three-dimensional first dither mask has, wherein a direction in which the second space is located when viewed from the first space is different from a direction in which the third space is located when viewed from the first space, and wherein a direction in which the second subspace is located when viewed from the first subspace is different from a direction in which the fourth subspace is located when viewed from the third subspace.

14. The image processing device according to claim 1, wherein $2^\alpha$ pixels are disposed in a first direction, $2^\alpha$ pixels are disposed in a second direction orthogonal to the first direction, and $2^\alpha$ pixels are disposed in a third direction orthogonal to the first direction and the second direction in the first space where $\alpha$ is a natural number of 2 or more.

15. The image processing device according to claim 1, further comprising:

a head unit ejecting a liquid based on the first display data.

16. The image processing device according to claim 1, wherein the generation unit supplies the first display data to a recording apparatus including a head unit ejecting a liquid based on the first display data.

17. The image processing device according to claim 1, wherein the acquisition unit acquires first color image data, of the first image data, corresponding to a first color, and second color image data, of the first image data, corresponding to a second color different from the first color, wherein the generation unit generates first color display data, of the first display data, corresponding to the first color by performing a quantization process on the first color image data using one three-dimensional first dither mask of a plurality of the three-dimensional first dither masks, and generates second color display data, of the first display data, corresponding to the second color by performing a quantization process on the second color image data using another three-dimensional first dither mask of the three-dimensional first dither masks, and wherein the one three-dimensional first dither mask is different from the another three-dimensional first dither mask.

18. A recording apparatus that forms an image on a three-dimensional object, the apparatus comprising:

a head unit ejecting a liquid; and a controller controlling an ejection of a liquid from the head unit so that the image is formed on the object by a plurality of dots formed by the liquid ejected from the head unit, wherein the controller controls an ejection of a liquid from the head unit so that when the object has a first face, a distribution of a plurality of dots in the first face has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the object has a second face extending in a direction different from a direction of the first face, a distribution of a plurality of dots in the second face has a frequency characteristic in which an amount of high frequency components in a range of spatial frequencies higher than a predetermined frequency is larger than an amount of low frequency components in a range of spatial frequencies lower than the predetermined frequency in a spatial frequency domain.

19. The recording apparatus according to claim 18, wherein a distribution of a plurality of dots on the first face has a frequency characteristic different from a white noise characteristic in a spatial frequency domain, and a distribution of a plurality of dots on the second face has a frequency characteristic different from a white noise characteristic in a spatial frequency domain.

20. The recording apparatus according to claim 18, wherein a distribution of a plurality of dots on the first face has a blue noise characteristic in a spatial frequency domain, and a distribution of a plurality of dots on the second face has a blue noise characteristic in a spatial frequency domain.

21. An image processing method comprising:

an acquisition step of acquiring, when representing an image in a three-dimensional first space, first image data indicating a gradation value of an image to be displayed by each of a plurality of pixels in the first space; and a generation step of generating first display data by quantizing a gradation value indicated by the first image data using a three-dimensional first dither mask having a plurality of threshold values corresponding to a plurality of pixels in the first space, wherein in the three-dimensional first dither mask, when the first space is cut by a first plane, a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by a second plane that is not parallel to the first plane, a plurality of threshold values in the second plane has a frequency characteristic in which an amount of high frequency components in a range of spatial frequencies higher than a predetermined frequency is larger than an amount of low frequency components in a range of spatial frequencies lower than the predetermined frequency in a spatial frequency domain.

22. A non-transitory computer-readable storage medium storing a program, the program causing a computer to function as:

an acquisition unit acquiring, when representing an image in a three-dimensional first space, first image data indicating a gradation value of an image to be displayed by each of a plurality of pixels in the first space; and a generation unit generating first display data by quantizing a gradation value indicated by the first image data using a three-dimensional first dither mask having a plurality of threshold values corresponding to a plurality of pixels in the first space, wherein in the three-dimensional first dither mask, when the first space is cut by a first plane, a plurality of threshold values in the first plane has a frequency characteristic in which an amount of high frequency components in a range of spatial frequencies higher than a predetermined frequency is larger than an amount of low frequency components in a range of spatial frequencies lower than the predetermined frequency in a spatial frequency domain, and when the first space is cut by a second plane that is not parallel to the first plane, a plurality of threshold values in the second plane has a frequency characteristic in which an amount of high frequency components in a range of spatial frequencies higher than the predetermined frequency is larger than an amount of low frequency components in a range of spatial frequencies lower than the predetermined frequency in a spatial frequency domain.

* * * * *